US008376842B2

(12) United States Patent
Rasmussen et al.

(10) Patent No.: US 8,376,842 B2
(45) Date of Patent: Feb. 19, 2013

(54) WAGERING GAME SYSTEM WITH DOCKING STATIONS

(75) Inventors: James M. Rasmussen, Chicago, IL (US); Norman R. Wurz, Des Plaines, IL (US); Mark B. Gagner, West Chicago, IL (US); William C. Cesaroni, Glenview, IL (US); Shawn O. Barrett, Libertyville, IL (US); Vladimir I. Arezina, Chicago, IL (US); Jim Motyl, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/295,307

(22) Filed: Nov. 14, 2011

(65) Prior Publication Data

US 2012/0129611 A1 May 24, 2012

Related U.S. Application Data

(63) Continuation of application No. 12/304,070, filed as application No. PCT/US2007/013605 on Jun. 8, 2007, now Pat. No. 8,057,303.

(60) Provisional application No. 60/804,401, filed on Jun. 9, 2006, provisional application No. 60/823,052, filed on Aug. 21, 2006, provisional application No. 60/885,730, filed on Jan. 19, 2007.

(51) Int. Cl.
*A63F 9/24* (2006.01)
*A63F 13/00* (2006.01)

(52) U.S. Cl. ................. 463/29; 463/16; 463/20; 463/42

(58) Field of Classification Search .......... 463/1, 16–20, 463/25, 29, 40–42; 273/138.1, 139; 710/303, 710/304
See application file for complete search history.

(56) References Cited

U.S. PATENT DOCUMENTS

| | | | |
|---|---|---|---|
| 5,655,966 | A | 8/1997 | Werdin, Jr. et al. |
| 5,889,964 | A | 3/1999 | Cho et al. |
| 6,354,941 | B2 | 3/2002 | Miller et al. |
| 8,057,303 | B2 | 11/2011 | Rasmussen et al. |
| 2001/0032321 | A1 | 10/2001 | Nanno et al. |
| 2001/0044337 | A1 | 11/2001 | Rowe et al. |
| 2002/0010013 | A1 | 1/2002 | Walker et al. |
| 2002/0193099 | A1 | 12/2002 | Paulsen |
| 2003/0064805 | A1 | 4/2003 | Wells |
| 2004/0137987 | A1 | 7/2004 | Nguyen |
| 2004/0142744 | A1 | 7/2004 | Atkinson et al. |

(Continued)

FOREIGN PATENT DOCUMENTS

WO WO-2007146177 A3 12/2007

OTHER PUBLICATIONS

"U.S. Appl. No. 12/304,070, Examiner Interview Summary Requested Jul. 19, 2011", 4 pgs.

(Continued)

*Primary Examiner* — Milsap Shah
(74) *Attorney, Agent, or Firm* — Schwegman Lundberg & Woessner, P.A.

(57) ABSTRACT

This description describes wagering game systems that include docking stations. In one embodiment, the apparatus includes a presentation unit configured to present a wagering game and a docking controller configured to detect when the apparatus is docked with a docking station and to detect when the apparatus is undocked from the docking station. The apparatus can also include a docking port, the docking port including at least one of a dock power unit configured to receive power via the docking station and a dock communication unit configured to receive wagering game content associated with the wagering game, the dock communication unit configured to receive the wagering game content when the apparatus is docked with the docking station. The apparatus can also include a wireless communication unit configured to receive the wagering game content when the docking controller when the apparatus is undocked from the docking station.

17 Claims, 15 Drawing Sheets

U.S. PATENT DOCUMENTS

| | | | | |
|---|---|---|---|---|
| 2005/0070358 | A1 | 3/2005 | Angell et al. | |
| 2005/0130728 | A1 | 6/2005 | Nguyen | |
| 2006/0035707 | A1 | 2/2006 | Nguyen et al. | |
| 2006/0058088 | A1 * | 3/2006 | Crawford et al. | 463/13 |
| 2006/0068871 | A1 * | 3/2006 | Crawford et al. | 463/13 |
| 2006/0264252 | A1 * | 11/2006 | White et al. | 463/13 |
| 2007/0040652 | A1 | 2/2007 | Quatro | |
| 2007/0058332 | A1 | 3/2007 | Canterbury et al. | |
| 2007/0087830 | A1 | 4/2007 | Varma et al. | |
| 2008/0076572 | A1 | 3/2008 | Nguyen et al. | |
| 2008/0096659 | A1 | 4/2008 | Kreloff et al. | |
| 2009/0005165 | A1 | 1/2009 | Arezina et al. | |
| 2009/0075724 | A1 * | 3/2009 | Breeding et al. | 463/25 |
| 2009/0098925 | A1 * | 4/2009 | Gagner et al. | 463/20 |
| 2010/0069160 | A1 | 3/2010 | Barrett et al. | |
| 2010/0234099 | A1 | 9/2010 | Rasmussen et al. | |

OTHER PUBLICATIONS

"U.S. Appl. No. 12/304,070, Non Final Office Action mailed Mar. 17, 2011", 11 pgs.
"U.S. Appl. No. 12/304,070, Notice of Allowance mailed Aug. 1, 2011", 9 pgs.
"U.S. Appl. No. 12/304,070, Preliminary Amendment filed Dec. 9, 2008", 3 pgs.
"U.S. Appl. No. 12/304,070, Response filed Jul. 18, 2011 to Non Final Office Action mailed Mar. 17, 2011", 10 pgs.
"International Application Serial No. PCT/US2007/13605 Written Opinion mailed Jun. 10, 2008", p. 237, 6 pgs.
"International Application Serial No. PCT/US2007/13605, Search Report mailed Jul. 10, 2008", p. 220, 6 pgs.

* cited by examiner

WAGERING GAME SYSTEM WITH DOCKING STATIONS

RELATED APPLICATIONS

This patent application is continuation of U.S. patent application Ser. No. 12/304,070, filed Dec. 9, 2008, now issued as U.S. Pat. No. 8,057,303, which is a U.S. National Stage Filing under 35 U.S.C. 371 from International Patent Application Serial No. PCT/US2007/013605, filed Jun. 8, 2007, and published on Dec. 21, 2007, as WO 2007/146177 A2 and republished as WO 2007/146177 A3, which claims the priority benefit of U.S. Provisional Patent Application Ser. No. 60/804,401 filed Jun. 9, 2006 and entitled "WAGERING GAME SYSTEM WITH DOCKING STATIONS", and to U.S. Provisional Patent Application Ser. No. 60/823,052 filed Aug. 21, 2006 and entitled "WAGERING GAME SYSTEM WITH DOCKING STATIONS", and to U.S. Provisional Patent Application Ser. No. 60/885,730 filed Jan. 19, 2007 and entitled "WAGERING GAME SYSTEM WITH DOCKING STATIONS", the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wagering game systems, and more particularly, to wagering game systems including mobile wagering game devices and docking stations.

BACKGROUND

Wagering game machines, such as slot machines, video poker machines, and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are most likely attracted to the most entertaining and exciting of the machines. Consequently, shrewd operators strive to employ the most entertaining and exciting machines available because such machines attract frequent play and increase profitability for the operator. In the competitive wagering game machine industry, there is a continuing need for manufacturers to produce new game types or to enhance entertainment and excitement associated with existing wagering game machines.

BRIEF DESCRIPTION OF THE FIGURES

The present invention is illustrated by way of example and not limitation in the Figures of the accompanying drawings in which.

DESCRIPTION OF THE EMBODIMENTS

Introduction

Figure 1:
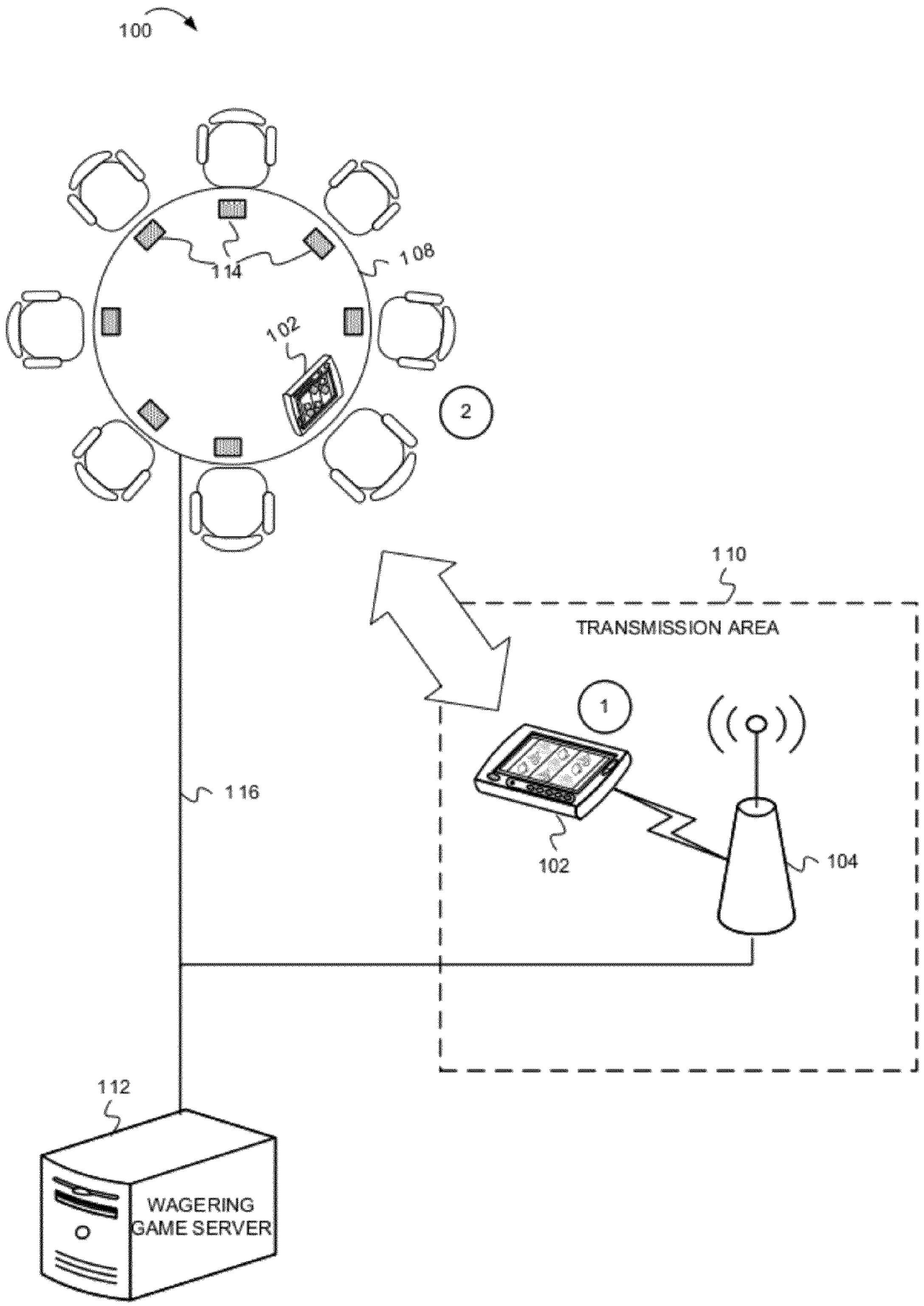
FIG. 1 is a block diagram illustrating a mobile wagering game device operating in undocked and docked modes, according to example embodiments of the invention.

This section introduces embodiments of a wagering game network including mobile wagering game devices and docking stations. The mobile wagering game devices can operate in undocked and docked modes. In undocked mode, the mobile wagering game devices can use battery power, while receiving content through wireless access points. In docked mode, the mobile wagering game devices can be identified as being docked and can further receive power and/or content from docking stations. In addition to providing power and/or content, docking stations can include input/output devices (e.g., speakers, voucher printers, etc.) for use by the mobile devices. Also, docking stations can hold the mobile devices in various user-selected orientations, freeing players from having to manually support the mobile devices. FIG. 1 describes some of these features in more detail.

FIG. 1 is a block diagram illustrating a mobile wagering game device operating in undocked and docked modes, according to example embodiments of the invention. In FIG. 1, the wagering game network 100 includes a mobile wagering game device 102 (hereinafter "mobile device"), wireless access point 104, wagering game server 112 (hereinafter "game server"), and docking station 108.

FIG. 1 shows two stages of operation for the mobile device 102. During stage one, the mobile device 102 operates in undocked mode, where it can use the wireless access point 104 to play wagering games (e.g., slots, video poker, etc.) hosted by the game server 112. In undocked mode, the mobile device 102 can move freely about a transmission area 110. However, when the mobile device 102 leaves the transmission area 110, the mobile device 102 cannot use the wireless access point 104 to communicate with the game server 112 because it will be outside the wireless access point's transmission range. In an alternative embodiment, the docking station 108 can be located inside the transmission area 110.

During stage two, the mobile device 102 operates in docked mode. After the mobile device 102 moves outside the transmission area 110, it docks with the docking station 108. The docking station 108 includes several docking ports 114 though which it identifies the mobile device 102 docked to the wagering game network 100 and provides power and/or wagering game content to the mobile device 102. As shown in FIG. 1, the docking port 114 can hold the mobile device 102 in a semi-upright position. While docked, the mobile device 102 can present wagering games hosted by the game server 112, as the docking station 108 can be connected to the game server 112 via a wired link 116. The mobile device 102 can also charge its battery and update its gaming and/or control software while docked with the docking station 108. In one embodiment, the docking station 108 can host community games (e.g., Video No Limit Texas Hold 'Em Poker) in which a plurality of docked mobile devices can participate.

While this section introduces some embodiments, the following sections will describe other embodiments that include different features.

Architectures, Devices, and Wireless Environment

This section describes example architectures which embodiments of the invention can be practiced. This section will first present an example wagering game network architecture and then an example mobile wagering game device architecture.

Example Wagering Game Network Architecture

Figure 2:
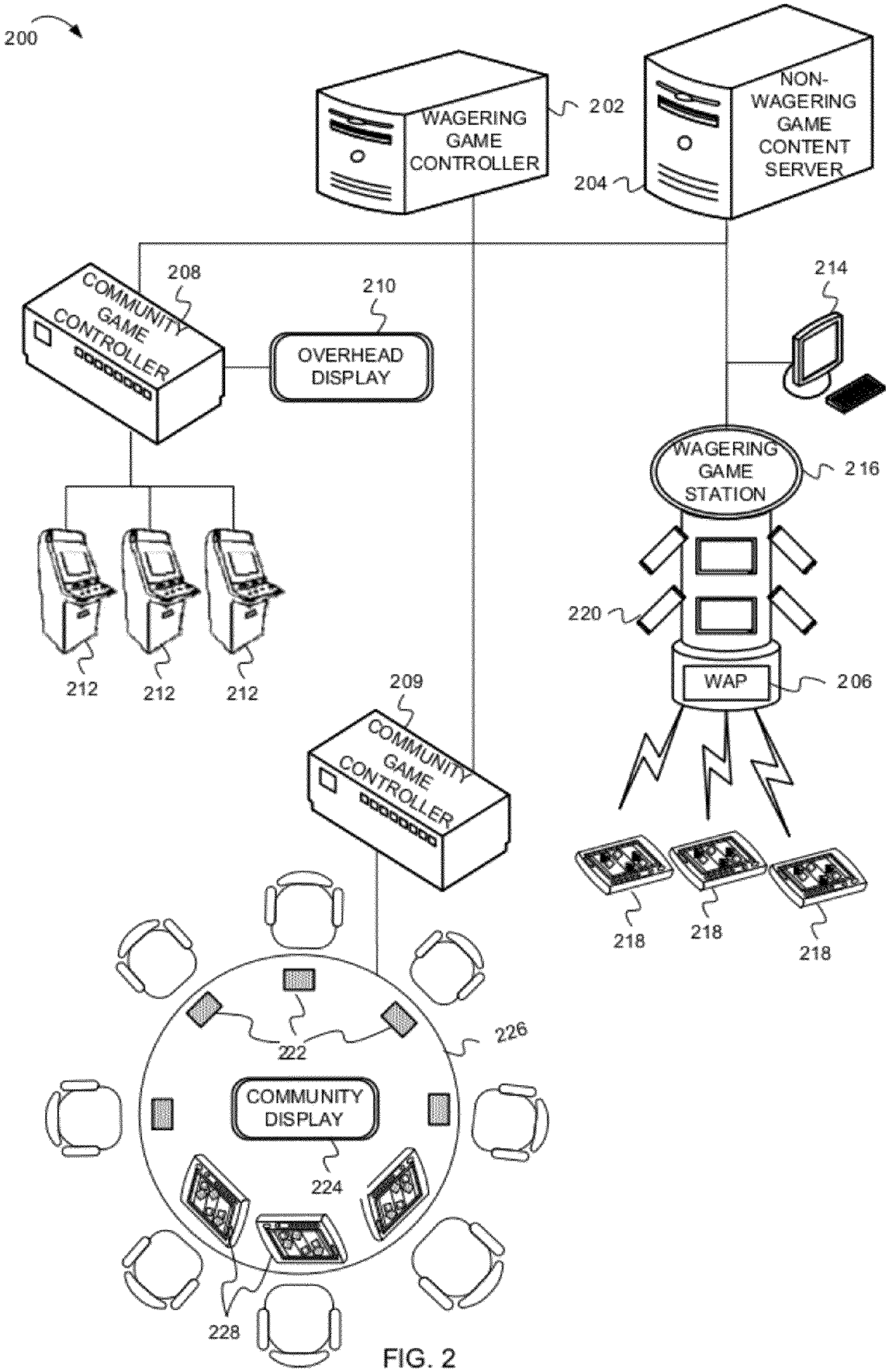
FIG. 2 is a block diagram illustrating a wagering game network architecture, according to embodiments of the invention.

FIG. 2 is a block diagram illustrating a wagering game network architecture, according to embodiments of the invention. As shown in FIG. 2, the wagering game network 200 includes a wagering game controller 202 connected to a non-wagering game content server 204 and workstation 214. The wagering game controller 202 is also connected to community game controllers 208 and 209. The community game controller 208 is connected to an overhead display 210 and a plurality of wagering game machines 212. The community game controller 209 is connected to a docking station 226.

The docking station 226 includes a community display 224 and docking ports 222. The community display 224 can present content that is part of a community wagering game or it can present other content, such as attract mode content, non-wagering game content (e.g., a sporting event), etc. The community display 224 can be disposed on or inside the docking station 226 or it can be positioned at a remote location (e.g., overhead). The docking ports 222 can identify mobile devices 228 docked to the wagering game network 200 and can further provide power, wagering game content, and/or non-wagering game content to docked mobile devices 228. The docking ports 222 can include any suitable interface for identifying mobile devices 228 docked to the docking ports 222, such as radio frequency identification (RFID) interface, power interface suitable for carrying communication/identification signals, or other suitable communication technology to identify docked mobile device 228. The docking ports 222 can include any suitable interface for delivering power to docked mobile devices 228, such as surface-contact charging pads, pins, sockets, inductive charging components, etc. The docking ports 222 can provide power from an onboard battery (not shown) or they can provide power received from a wall socket or other suitable power source. Additionally, the docking ports 222 can include any suitable communication technology for delivering wagering game content and non-wagering game content to docked mobile devices 228. For example, the docking ports 222 can include IEEE 802.11G transceivers, infrared transceivers, Bluetooth transceivers, etc.

Wagering game content can include instructions and/or data for conducting wagering games (e.g., video slots, video poker, video black jack, and the like). For example, wagering game content can also include program code, audio content, video content, language content, and/or other data used for conducting all or part of a casino style slots game and/or bonus games. The wagering game content can also include executable game code, operating system code, interpretable scripts, byte codes, assembly instructions, game math, random number generators, art, configuration data (enumerating allowable percentages, denominations, paylines, etc.), operating system features, peripheral device drivers, attract mode displays, advertisements, and episodic game content. Additionally, the wagering game content can include game results and other information used in presenting a wagering game on a mobile device.

Because the docking ports 222 can include components for wirelessly delivering power and content delivery, the mobile devices 228 can operate in docked mode even though they are not mechanically connected to docking ports. Alternatively, some mobile devices 228 may operate in undocked mode until they are mechanically connected to docking ports 222.

In one embodiment, the docking station 226 and community game controller 209 can conduct community wagering games for the docked mobile devices 228. In order to facilitate position sensitive games (e.g., Video Texas Hold 'Em Poker), the community game controller 209 can determine at which docking port 222 each mobile device 228 is docked, identifying each mobile device 228 via RFID, power interface carrying communication/identification signals, or other suitable communication technology to identify each mobile device 228.

The wagering game stations 216 can include wireless access points 206 that enable the mobile wagering game device 218 to wirelessly communicate with the wagering game network devices (e.g., community game controller 208). In one embodiment, because the wagering game stations 216 include the wireless access points 206, the wagering game stations 216 can define a space in which the mobile wagering game device 218 can present wagering games. The wagering game stations 216 can be repositioned about a casino to define different wagering game areas.

In one embodiment, the wireless access points 206 can be separate from the wagering game stations 216. In one embodiment, where the wireless access points are not included in the wagering game stations 216, the wireless access points 206 are hotspots for the mobile wagering game device 218. In another embodiment, if the wireless access points 206 are included in the wagering game stations 216, the wagering game stations 216 form wireless hot spots for the mobile wagering game device 218. In one embodiment, the wireless access points 206 can employ the 802.11g, 802.11b, or other suitable wireless communication protocols. In one embodiment, the wireless access points 206 can be Linksys WAP54G Wireless-G Access Points, available from Linksys, a division of Cisco Systems of Santa Clara, Calif. In another embodiment, the wireless access points 206 can include any suitable wireless access point technology.

In one embodiment, if the docking station 226 is within communication range of the wireless access point 206, the mobile device 228 can use the wireless access point 206 to communicate at the same time as it is using the docking station 226 to communicate. In another embodiment, if the docking station 226 is within communication range of the wireless access point 206, the mobile device 228 can use the wireless access point 206 to communicate while it is receiving power through the docking station 226.

The wagering game network 200 also includes wagering game stations 216 that can store and provide docks for the mobile wagering game device 218. In one embodiment, the wagering game stations 216 include receptacles 220 for securely storing, recharging, sanitizing, and updating the mobile wagering game devices 218. In another embodiment, receptacles 220 can further provide a suitable interface for identifying mobile devices 218 docked to the receptacles 220, such as radio frequency identification (RFID), power interface suitable for carrying communication/identification signals, or other suitable communication technology to identify docked mobile device 218.

In one embodiment, in both undocked and docked modes, the mobile devices can present wagering games, participate in community games, and connect with wagering game network 200 devices to receive information and services. An example mobile device architecture will be described later in this section.

The wagering game controller 202 can store and disseminate software updates to the docked mobile devices 228 and undocked mobile devices 218. The software updates can include configuration information (e.g., device drivers, wagering game code, etc.) and wagering game content. The wagering game content can include audio content, video content (e.g., new bonus events, wagering game episodes), pay tables, configuration information, wagering game outcomes, etc.

The non-wagering game content server 204 can provide non-wagering game content, such as television footage, Internet content, audio content, or any other non-wagering game information. The non-wagering game content server 204 in combination with docking ports 222 and/or receptacles 220 having suitable interfaces described above can further identify mobile devices 228 docked to particular docking ports 222 and/or receptacles 220. Specifically, non-wagering game content server 204 can maintain and use this identification data for non-wagering game content distribution to particular identified mobile devices 228, and can further transmit this identification to wagering game controller 202, which can use this identification for wagering game content distribution and to the work station 214. The workstation 214 provides an administrator interface to the wagering game controller 202 and non-wagering game content server 204. Thus, system administrators can use the workstation 214 to configure and/or access information stored in the wagering game controller 202, the non-wagering game content server 204, and any other component of the wagering game network 200.

This section continues with a discussion of an example mobile device architecture.

Example Mobile Wagering Game Unit Architecture

Figure 3:
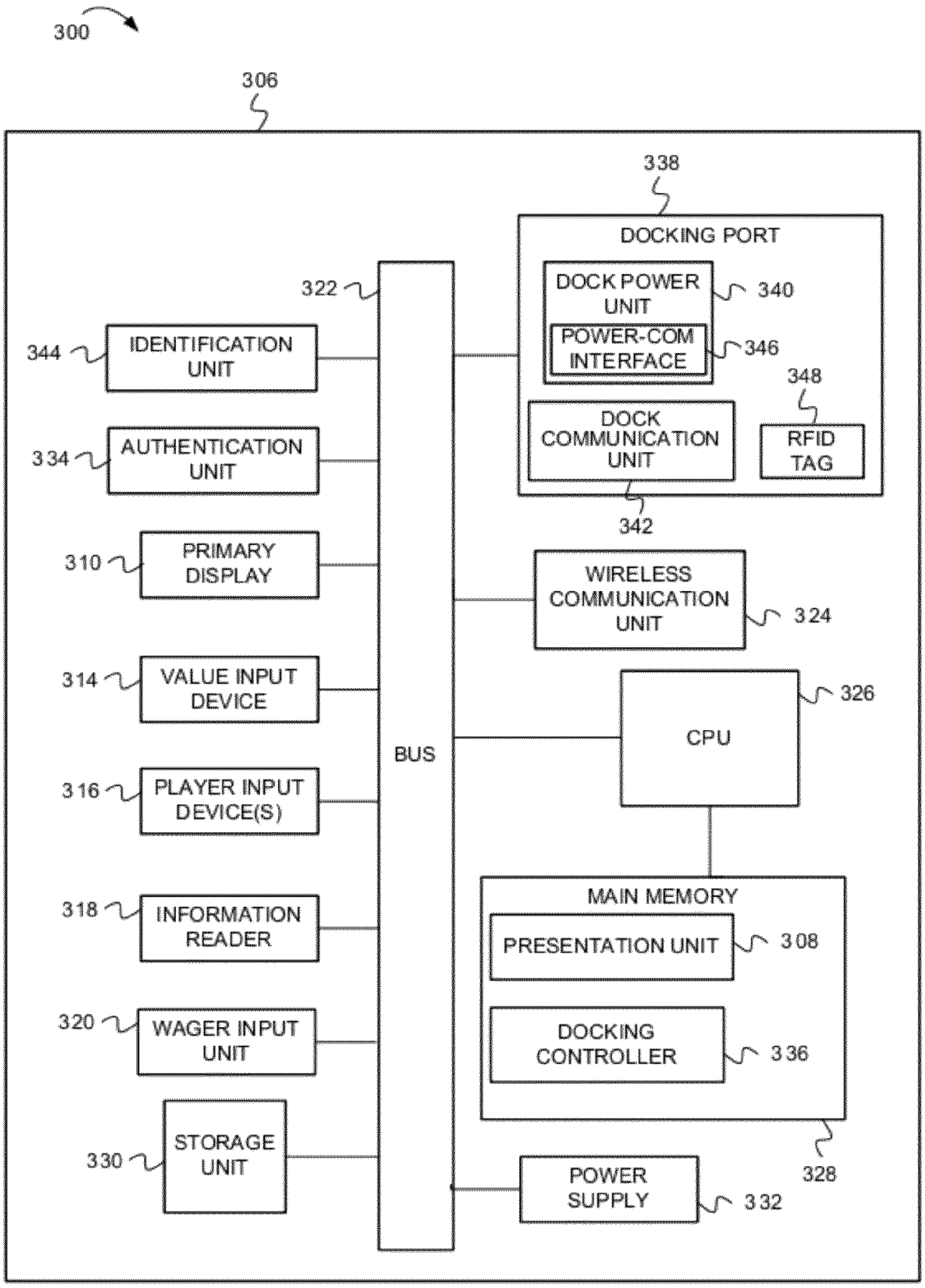
FIG. 3 is a block diagram illustrating a mobile wagering game device architecture, according to example embodiments of the invention.

FIG. 3 is a block diagram illustrating a mobile wagering game device architecture, according to example embodiments of the invention. As shown in FIG. 3, the mobile wagering game device 306 includes a bus 322, which is connected to a docking port 338. The docking port 338 includes a dock power unit 340 having a power-communication interface 346, a dock communication unit 342, and can also include a radio frequency identification (RFID) tag 348. The dock power unit 340 can include any suitable interface for receiving power from a docking station and for carrying communication/identification signals to and from the docking station. The power-communication interface 346 encodes the communication/identification signals onto and decodes the signals from the dock power unit 340, including wagering game content, non-wagering game content and identification of mobile wagering game device 306 over a network. For example, the dock power unit 340 can include surface-contact charging pads, pins, sockets, inductive charging components, etc. The dock communication unit 342 can include any suitable communication technology for transmitting and receiving wagering game content and non-wagering game content over a network. For example, the dock communication unit can include an IEEE 802.11G transceiver, infrared transceiver, Bluetooth transceiver, etc. When the mobile device 306 is docked, the RFID tag 348 can be automatically activated as the docking port 338 (and RFID tag 348) of the wagering game machine 306 is brought into close proximity with the docking station or docking port, via an RFID reader in the docking port or the docking station, to provide identification signals over a network. After docking, the RFID reader can periodically poll the RFID tag 348 (e.g., 1 to 5 second intervals) to determine whether the mobile device 306 is still docked and to provide the identification signals identifying the wagering game machine 306 via RFID tag 348.

The bus 322 is connected to a central processing unit (CPU) 326, which is connected to a main memory 328. The main memory 328 can include a presentation unit 308 that can present wagering games, such as video poker, video black jack, video slots, video lottery, etc. The main memory 328 can also include a docking controller 336 that can determine whether the mobile device 306 is docked with a docking station. The docking controller 336 can detect when power and/or communications are received through the docking port 338 or RFID tag 348 activated. In one embodiment, if power and/or communications are received through the docking port 338, the docking controller 336 configures the mobile device 306 to operate in docked mode. Otherwise the docking controller 336 can configure the mobile device 306 to operate in undocked mode.

In one embodiment, when the mobile device 306 is not docked, the docking controller 336 can take various measures to conserve power. For example, the docking controller 336 can restrict graphics to low power, low resolution configurations. The docking controller 336 can also reduce or eliminate sound and other features. However, when the mobile device 306 is docked, the docking controller 336 can configure the mobile device to draw power from through the dock power unit 340, operate in a high-power mode, utilize content received through the dock communication unit 342, and utilize peripheral devices addressable through the dock communication unit 342. Other embodiments can perform additional configuration operations.

In another embodiment, upon docking controller 336 detecting receipt of power through dock power unit 340, the docking controller 336 can notify the identification unit 344 to transmit identification signals identifying the wagering game machine 306 via the power-communication interface 346 of the dock power unit 340. Otherwise, upon docking controller 336 detecting receipt of communications via dock communication unit 342, the docking controller 336 can notify the identification unit 344 to transmit identification signals identifying the wagering game machine 306 via the dock communication unit 342. After docking (receipt of power and/or communications), the identification unit 344 can further query the docking controller 336 whether the mobile device 306 is still docked with the docking station and can periodically provide an identification signal identifying the wagering game machine 306 via the power-communication interface 346 of the dock power unit 340 or the dock communication unit 342.

The bus 322 is also connected to a wireless communication unit 324, which includes logic for communicating to wireless access points and/or other external systems. The wireless communication unit 324 can work in concert with an authentication unit 334, which includes logic for authenticating user and network credentials. Additionally, the bus 322 is connected to a primary display 310, value input device 314, player input device(s) 316, information reader 318, wager input unit 320, storage unit 330 (e.g., hard disk drive, semiconductor memory mass storage device, etc.), and power supply 332. The power supply 332 can include a rechargeable battery, such as a nickel cadmium battery.

In one embodiment, the mobile device 306 can include additional peripheral devices and/or more than one of each component shown in FIG. 3. For example, in one embodiment, the mobile device 306 can include multiple wireless communication units 324 and multiple CPUs 326. In one embodiment, any of the components can be combined or divided. Additionally, in one embodiment, the components of the mobile device 306 can be interconnected according to any suitable interconnection architecture (e.g., bus architecture, directly connected, hypercube, etc.).

In one embodiment, any of the components of the mobile device 306 (e.g., the presentation unit 308) can include hardware, firmware, and/or software for performing the operations described herein. In one embodiment, any of the mobile wagering game device's components (e.g., the presentation unit 308) can be embodied as instructions stored on a machine-readable medium, where the instructions are executable on the CPU 326 or other hardware. Machine-readable media can include any mechanism that provides (i.e., stores and/or transmits) information in a form readable by a machine (e.g., a mobile wagering game device, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

This description continues with a discussion of example mobile devices and docking stations.

Example Mobile Devices and Docking Stations

This section will describe some example implementations of the mobile devices and docking stations. This section will begin with a discussion of mobile devices.

Example Mobile Wagering Game Device

Figure 4A:
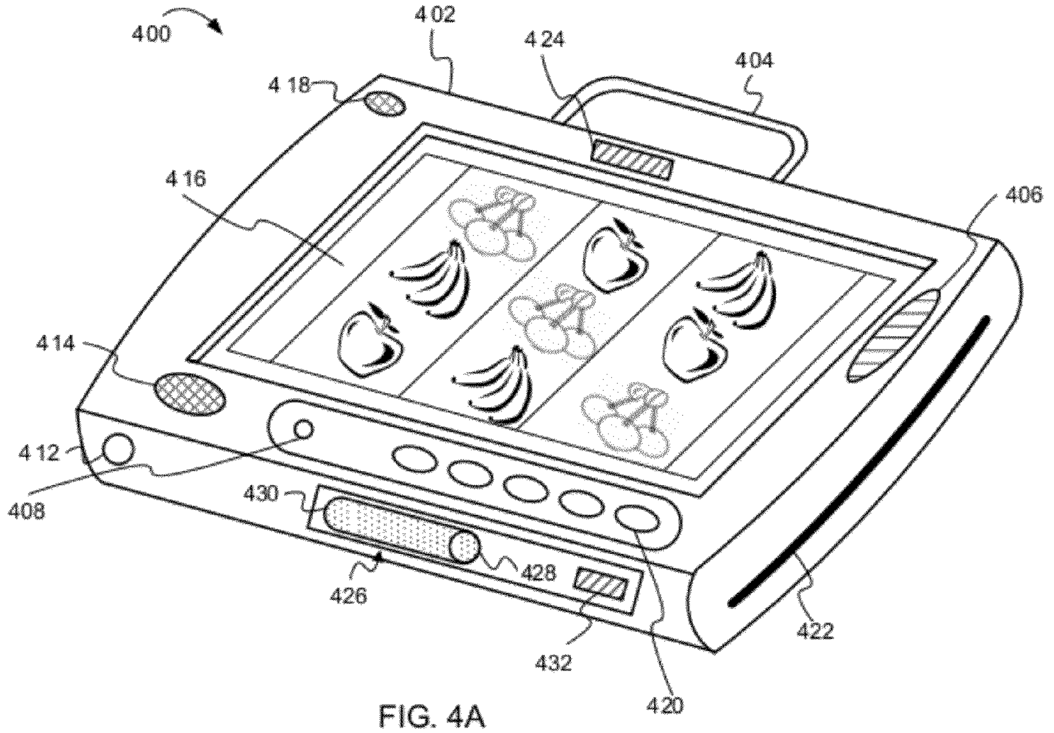
FIG. 4A is a top-side view of a mobile wagering game device, according to example embodiments of the invention.

FIG. 4A is a top-side view of a mobile wagering game device, according to example embodiments of the invention. As shown in FIG. 4A, the mobile wagering game device 400 includes a housing 402 for containing internal hardware and/or software such as that described above vis-à-vis FIG. 3. In one embodiment, the housing has a form factor similar to a tablet PC, while other embodiments have different form factors. For example, the mobile wagering game device 400 can exhibit smaller form factors, similar to those associated with personal digital assistants. In one embodiment, a handle 404 is attached to the housing 402. Additionally, the housing can store a foldout stand 410 (FIG. 4B), which can hold the mobile wagering game device 400 upright or semi-upright on a table or other flat surface.

The mobile wagering game device 400 includes several input/output devices. In particular, the mobile wagering game device 400 includes buttons 420, audio jack 408, speaker 414, display 416, biometric device 406, wireless transmission devices 412 and 424, microphone 418, and card reader 422. Additionally, the mobile wagering game device can include tilt, orientation, ambient light, or other environmental sensors.

In one embodiment, the mobile wagering game device 400 uses the biometric device 406 for authenticating players, whereas it uses the display 416 and speakers 414 for presenting wagering game results and other information (e.g., credits, progressive jackpots, etc.). The mobile wagering game device 400 can also present audio through the audio jack 408 or through a wireless link such as Bluetooth.

In one embodiment, the wireless transmission device 412 can include infrared wireless communications technology for receiving wagering game content while docked in a wagering game station 216 or a docking station 226. The wireless transmission device 424 can include an 802.11G transceiver for connecting to and exchanging information with wireless access points 206. The wireless transmission device 424 can include a Bluetooth transceiver for exchanging information with other Bluetooth enabled devices.

Figure 4B:
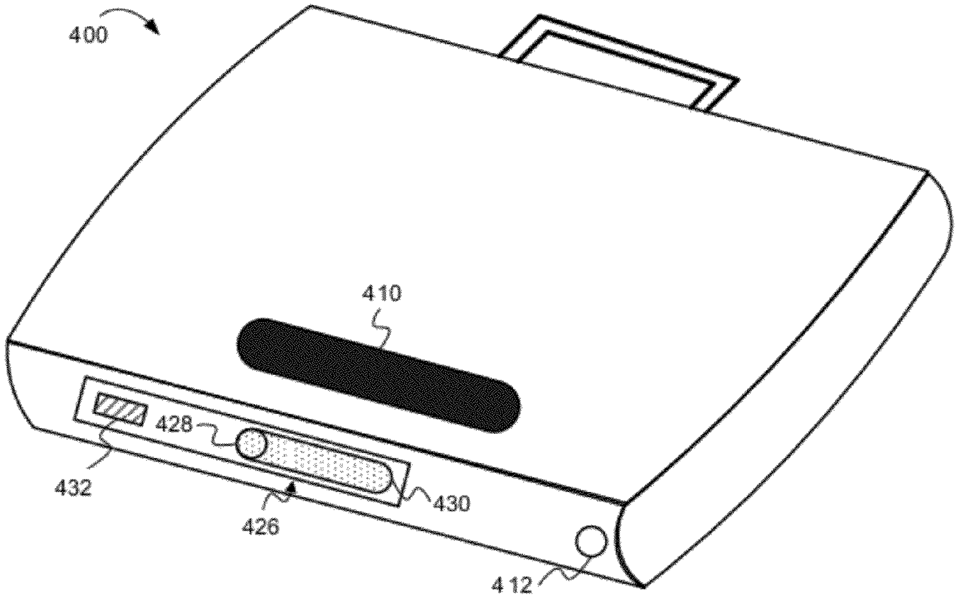
FIG. 4B is a bottom-side view of a mobile wagering game device, according to example embodiments of the invention.

FIG. 4B is a bottom-side view of a mobile wagering game device, according to example embodiments of the invention. As shown in FIG. 4B, the mobile wagering game device 400 includes a docking port 426. In one embodiment, the docking port 426 can include a suitable power interface 428, e.g., surface-contact charging pads or other facilities, for recharging the mobile wagering game device's battery and for carrying identification/communications signals to and from the wagering game device 400 and the wagering game station 216. The docking port 426 can also include a network interface (e.g., Ethernet interface) 430 through which a wagering game station 216 can communicate with and test the mobile wagering game device 400. In addition, the docking port 426 can further include an RFID tag 432. The RFID tag 432 may be passive or active and can be placed within housing 402.

In one embodiment, the mobile wagering game device 400 is constructed from damage resistant materials, such as polymer plastics. Portions of the mobile wagering game device 400 can be constructed from non-porous plastics which exhibit antimicrobial qualities. Also, the unit 400 can be liquid resistant for easy cleaning and sanitization. Further-more, unit 400 can also be water resistant so that it may be used near water (e.g., pool and the like).

Wireless Environment

In some embodiments, wireless access points and mobile devices can communicate orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, the wireless access points and mobile devices can communicate in accordance with a broadband multiple access technique, such as orthogonal frequency division multiple access (OFDMA). In some embodiments, the wireless access points and mobile devices can communicate using spread-spectrum signals.

In some embodiments, the wireless access points can be part of a communication station, such as wireless local area network (WLAN) communication station including a Wireless Fidelity (WiFi) communication station, or a WLAN access point (AP). In these embodiments, the mobile devices can be part of a mobile station, such as WLAN mobile station or a WiFi mobile station.

In some other embodiments, the wireless access points can be part of a broadband wireless access (BWA) network communication station, such as a Worldwide Interoperability for Microwave Access (WiMax) communication station, as the wireless access points can be part of almost any wireless communication device. In these embodiments, the mobile devices can be part of a BWA network communication station, such as a WiMax communication station.

In some embodiments, any of the mobile devices can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the frequency spectrums for the communication signals transmitted and received by the wireless access points and the mobile devices can comprise either a 5 gigahertz (GHz) frequency spectrum or a 2.4 GHz frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5 GHz, but other frequency spectrums are also equally suitable. In some BWA network embodiments, the frequency spectrum for the communication signals can comprise frequencies between 2 and 11 GHz.

In some embodiments, the wireless access points and the mobile devices can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access points and the mobile devices can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access points and the mobile devices can include one or more antennas (not shown). These antennas can comprise directional or omnidirectional antennas, including, for example, dipole antennas, monopole antennas, patch antennas, loop antennas, microstrip antennas or other types of antennas suitable for transmission of the RF signals. In some multiple-input, multiple-output (MIMO) embodiments, two or more antennas can be used. In some embodiments, instead of two or more antennas, a single antenna with multiple apertures can be used. In these multiple aperture embodiments, each aperture can be considered a separate antenna. In some multi-antenna embodiments, each antenna can be effectively separated to take advantage of spatial diversity and the different channel characteristics that can result between each of the antennas and another wireless communication device. In some multi-antenna embodiments, the antennas of a device can be separated by up to 1/10 of a wavelength or more.

In some embodiments, handoffs between different wireless access points 104 and one of the mobile devices can be performed based on a signal-to-noise ratio (SNR), a signal-to-noise and interference ratio (SNIR), a bit-error rate (BER), or an energy per received bit.

In some embodiments, the wireless access points and the mobile devices can communicate in accordance with standards such as the Pan-European mobile system standard referred to as the Global System for Mobile Communications (GSM). In some embodiments, the wireless access points and the mobile devices can also communicate in accordance with packet radio services such as the General Packet Radio Service (GPRS) packet data communication service. In some embodiments, the wireless access points and the mobile devices can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access points and the mobile devices can provide packet data services (PDS) utilizing packet data protocols (PDP). In other embodiments, the wireless access points and the mobile devices can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access points and the mobile devices can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access points and the mobile devices can communicate in accordance with an ultra-wideband (UWB) communication technique where a carrier frequency is not used. In other embodiments, the wireless access points and the mobile devices can communicate in accordance with an analog communication technique. In other embodiments, the wireless access points and the mobile devices can communicate in accordance with an optical communication technique, such as the Infrared Data Association (IrDA) standard. In some embodiments, the wireless access points and the mobile devices can communicate in accordance with the Home-RF standard which can be in accordance with a Home-RF Working Group (HRFWG) standard.

Example Docking Stations

This section continues with a discussion of docking stations.

Figure 5A:
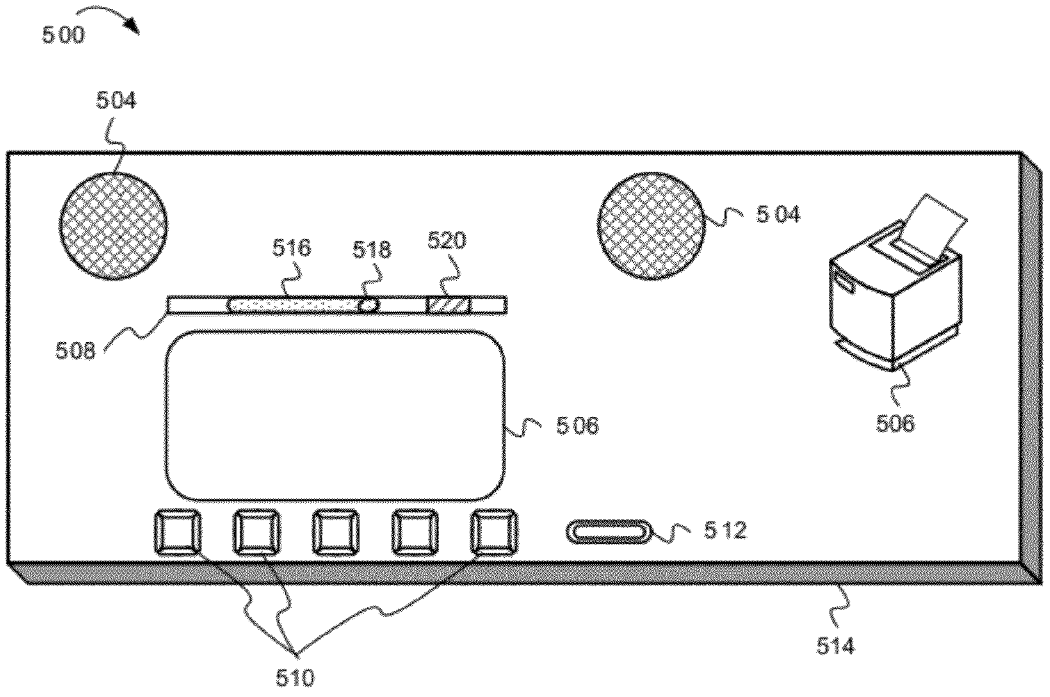
FIG. 5A is a block diagram illustrating a docking station that includes a docking port, according to example embodiments of the invention.

FIG. 5A is a block diagram illustrating a docking station 500 that includes a docking port 508, according to example embodiments of the invention. In FIG. 5A, docking port 508 of docking station 500 is unoccupied, e.g., a mobile device is not docked in docking port 508. The docking port 508 includes components for providing power and communications to mobile wagering game unit 502 (FIG. 5B) that is docked to docking port 508. Specifically, communications interface 516 can provide suitable communication technology for transmitting and receiving wagering game content, non-wagering game content, and identification over a network. Power interface 518 can provide power, identification and communications to and from mobile wagering game unit 502. Docking port 508 can provide an interface (not shown) to encode and decode identification/communication over the power interface 518. RFID reader 520 can automatically activate RFID tag 432 (FIG. 4B) as the RFID tag 432 of the mobile device 502 is brought into close proximity with RFID reader 520 of docking port 508 to provide identification signals over a network.

Figure 5B:
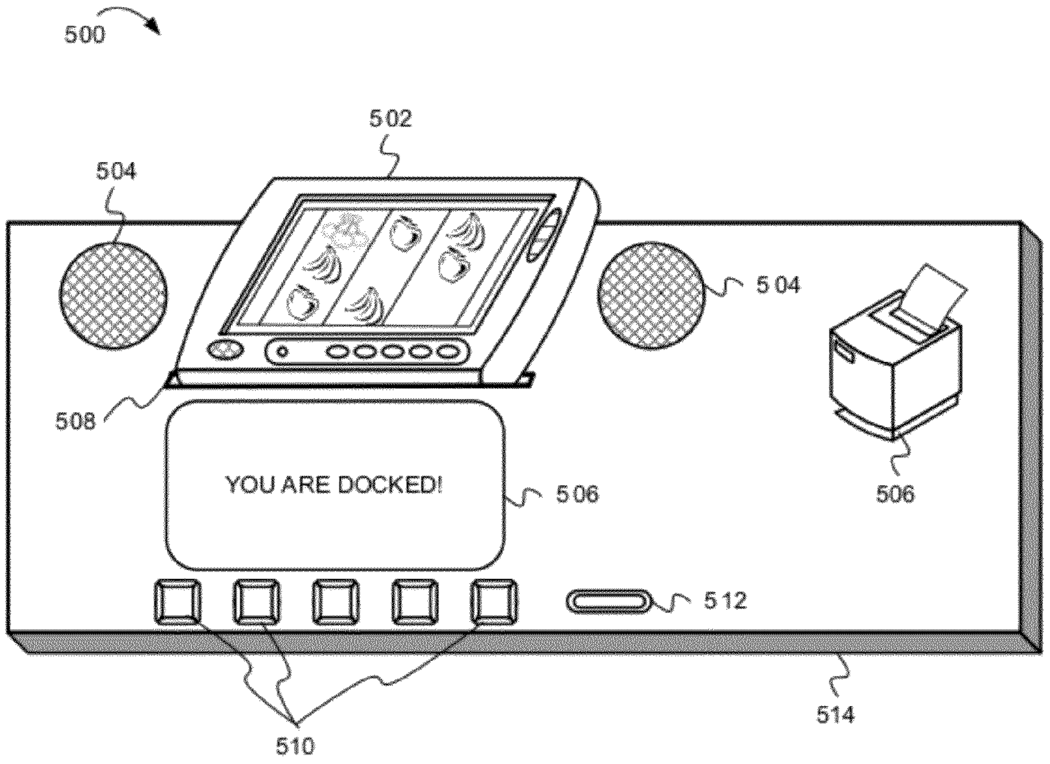
FIG. 5B is a block diagram illustrating a docking station including input/output devices for use by a mobile wagering game unit, according to example embodiments of the invention.

FIG. 5B is a block diagram illustrating a docking station 500 including input/output devices for use by a mobile wagering game unit 502, according to example embodiments of the invention. In FIG. 5, the docking station 500 includes a docking port 508 in which mobile wagering game unit 502 docked. As discussed above in the previous section, the docking port 508 can include components for providing power, communications and identification to the mobile device 502. After docking, mobile wagering game unit 502 can periodically transmit (e.g., 1-5 second intervals) its identification (e.g., MAC address) via the communications interface 518 or the power interface 518. The RFID reader 520 can periodically poll the RFID tag 432 (e.g., 1 to 5 second intervals) to receive the identification signals from RFID tag 432 (FIG. 4B) to identify the wagering game unit 502.

The docking station 500 also includes a plurality of input/output devices. In particular, the docking station 500 includes speakers 504, display 506, buttons 510, card reader 512, and voucher printer 506. While some of the input/output devices are shown as being contained within the docking station 500, they can be mounted on or about the docking station 500 at any suitable orientation.

When a mobile device 502 is docked with the docking station 500 via the docking port 508, the mobile device can use any of the docking station's input/output devices. For example, the mobile device 502 can print tickets on the voucher printer 506, present audio on the speakers 504, and present video on the display 506. The mobile device 502 can also receive input through the buttons 510 and the card reader 512. However, even though the mobile device 502 is docked, in some embodiments, the mobile device 502 can still receive input through its own input/output devices (e.g., its value input device 314, player input device 316, wireless communication unit 324, etc.).

In one embodiment, the docking station 500 includes pressure sensors and video projectors (not shown) disposed inside the cabinet 514. The pressure sensors can detect when objects touch the top surface of the cabinet 514, while the video projectors can project content onto the top surface of the cabinet. In one embodiment, the docking station 500 projects content onto the top surface of the cabinet 514 in response to detecting objects touching the cabinet 514.

This section continues with a discussion of FIGS. 6A-10, which describes several example implementations of a docking station.

Figure 6A:
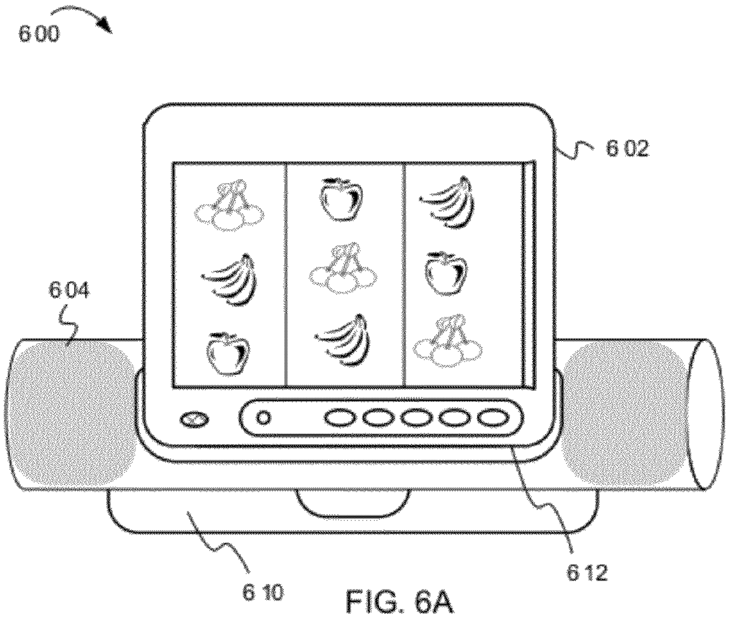
FIG. 6A is a front view of a docking station, according to example embodiments of the invention.

FIG. 6A is a front view of a docking station, according to example embodiments of the invention. In FIG. 6A, the docking station 600 includes a base 610, which is mountable on a flat surface, such as a bar top or table. The docking station also includes a docking port 612 for receiving a mobile device 602. The docking port 612 can hold the mobile device 602 in an upright or semi-upright orientation, as the base 610 can include a mechanism for changing the mobile device's orientation. The docking station 600 also includes speakers 604. In one embodiment, the mobile device 602 can receive input through its own input/output devices, while it can present audio through the speakers 606.

In one embodiment, the docking station 600 can include a plurality of docking ports 612 arranged side-by-side. Additionally, between each of the docking ports 612, the docking station 600 can include a card reader, printer, and bill acceptor, each of which can be accessible to mobile devices docked in the docking port 612.

Figure 6B:
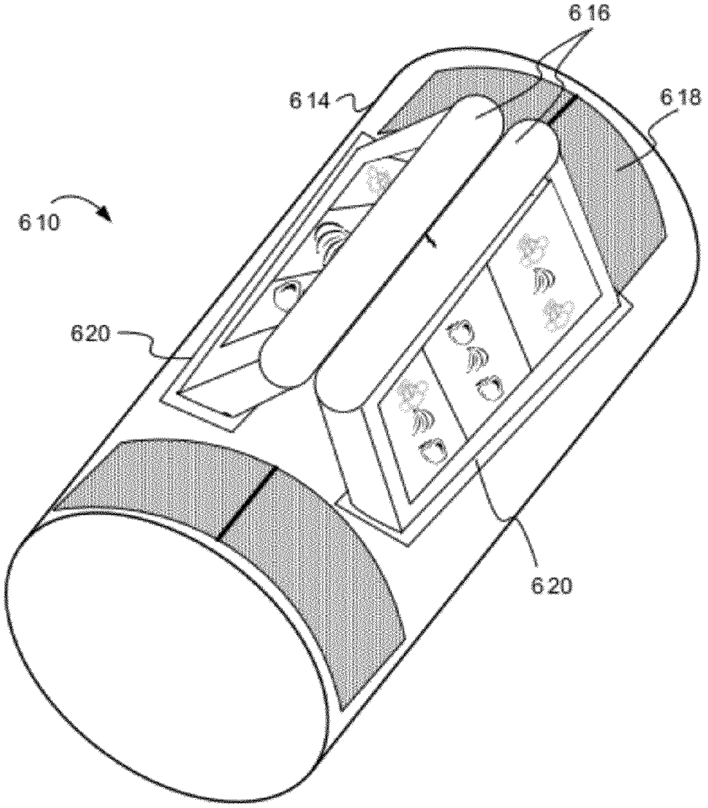
FIG. 6B is a perspective view of a docking station, according to example embodiments of the invention.

FIG. 6B is a perspective view of a docking station, according to example embodiments of the invention. In FIG. 6B, the docking station 610 includes a base 614 and docking ports 620. As shown in FIG. 6B, the docking ports 620 are adjacently positioned, enabling two mobile devices to dock with a relatively small footprint. The docking station 610 also includes speakers 618, which are available for use by the mobile device 616.

Figure 7:
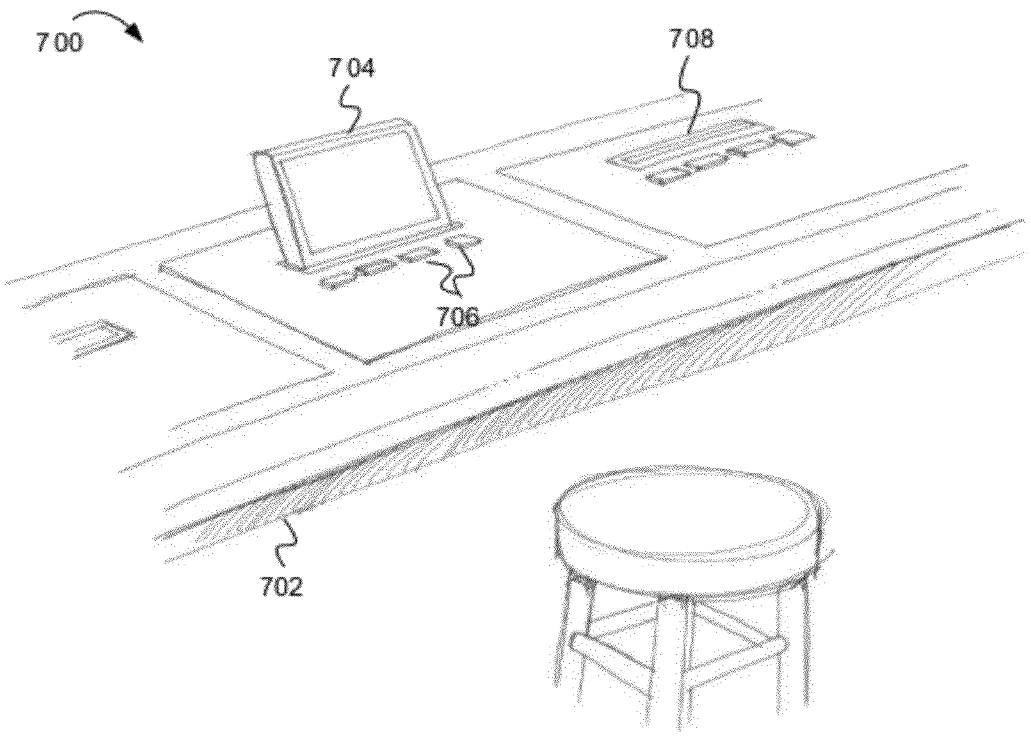
FIG. 7 is a perspective view of a bar top docking station, according to example embodiments of the invention.

FIG. 7 is a perspective view of a bar top docking station, according to example embodiments of the invention. In FIG. 7, docking stations 700 are embedded in a bar top 702. The docking stations 700 include docking ports 708 and input/output devices 706. In one embodiment, the input output devices 706 can include buttons, touch panels, speakers, or any other input/output devices suitable for use with a docked mobile device 704.

Figure 8:
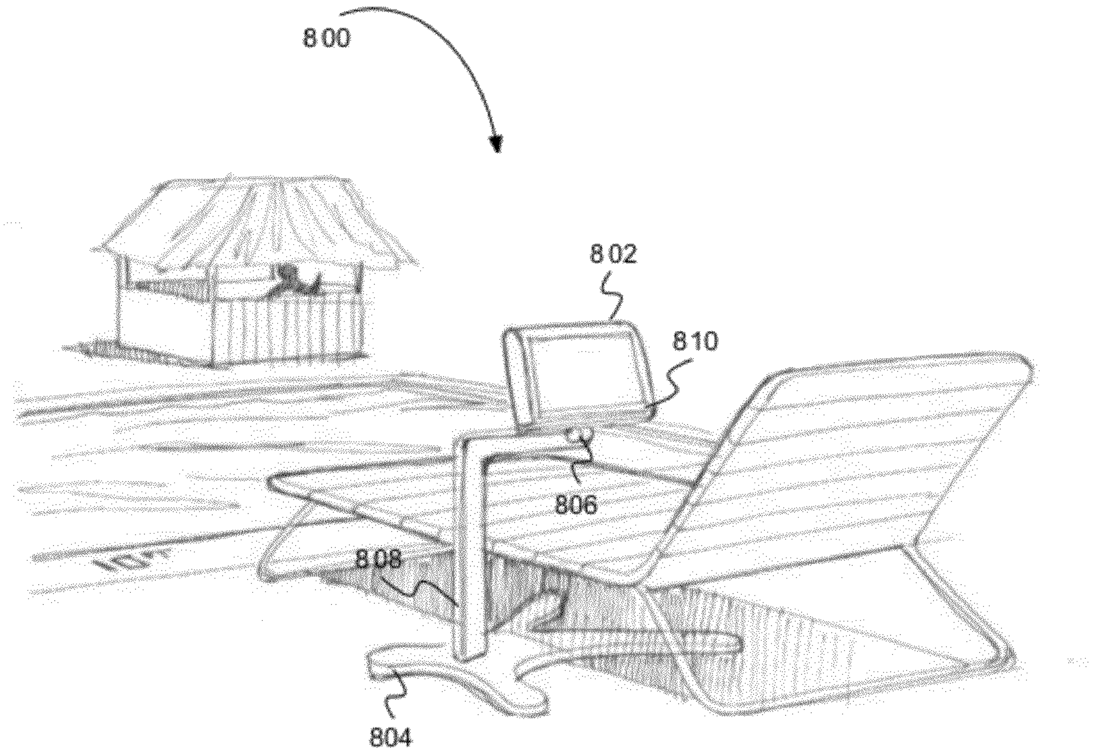
FIG. 8 is a perspective view of a chair-side docking station, according to example embodiments of the invention.

FIG. 8 is a perspective view of a chair-side docking station, according to example embodiments of the invention. FIG. 8 shows a docking station 800 including a base 804, arm 808, adjustable coupling 806, and docking port 810. As shown in FIG. 8, the docking station 800 can be used for holding a mobile device 802 next to a chaise or chair. A user can adjust the orientation of the mobile device 802 by adjusting the adjustable coupling 806. In one embodiment, the docking port 810 can include push buttons or other input/output devices for use with the mobile device 802.

The mobile device 802 can receive data and/or power through the docking port 810. In one embodiment, the docking station 800 includes a battery or other power source from which it can supply power to the mobile device 802. In another embodiment, the docking station 800 receives its power through a wall socket.

Figure 9:
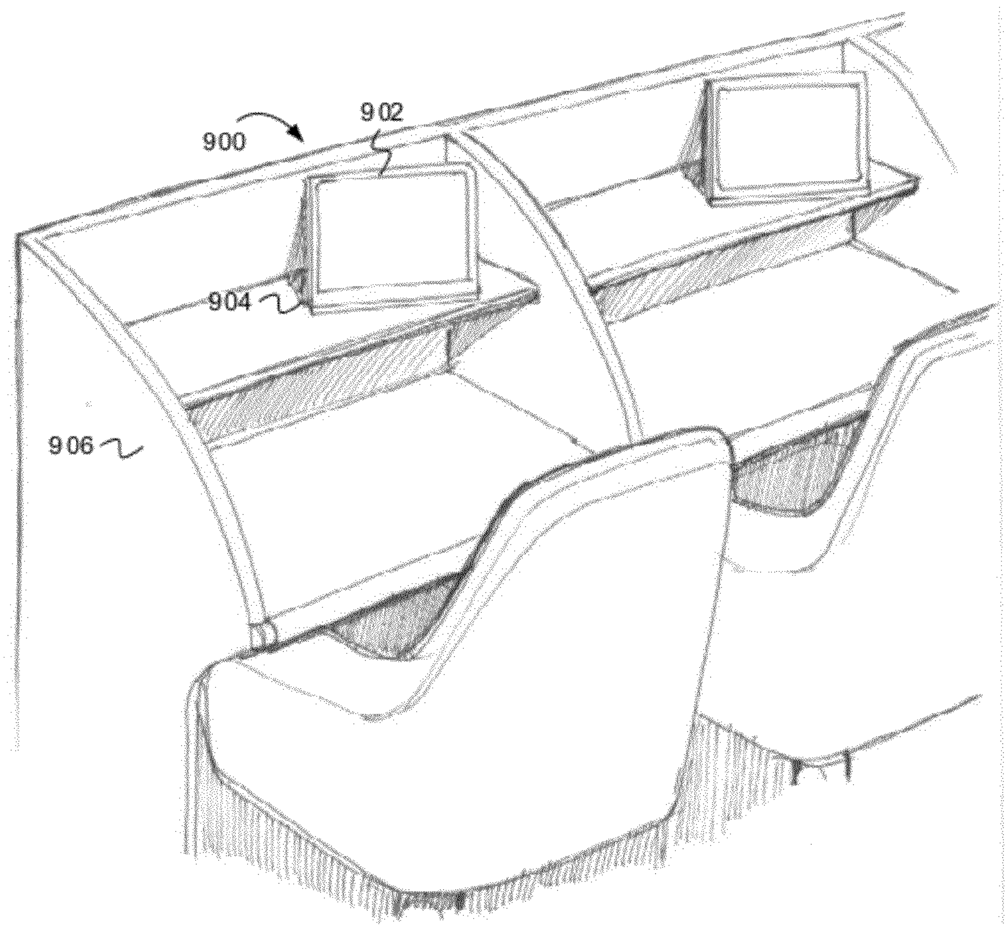
FIG. 9 is a perspective view of a cubicle-type of docking station, according to example embodiments of the invention.

FIG. 9 is a perspective view of a cubicle-type of docking station, according to example embodiments of the invention. In FIG. 9, the cubicle 906 includes a docking station 900. The docking station 900 includes a docking port 904 for docking with a mobile device 902. In one embodiment, the docking station 900 does not include input/output devices, so the mobile device 902 uses its own input/output devices for performing its operations.

Figure 10:
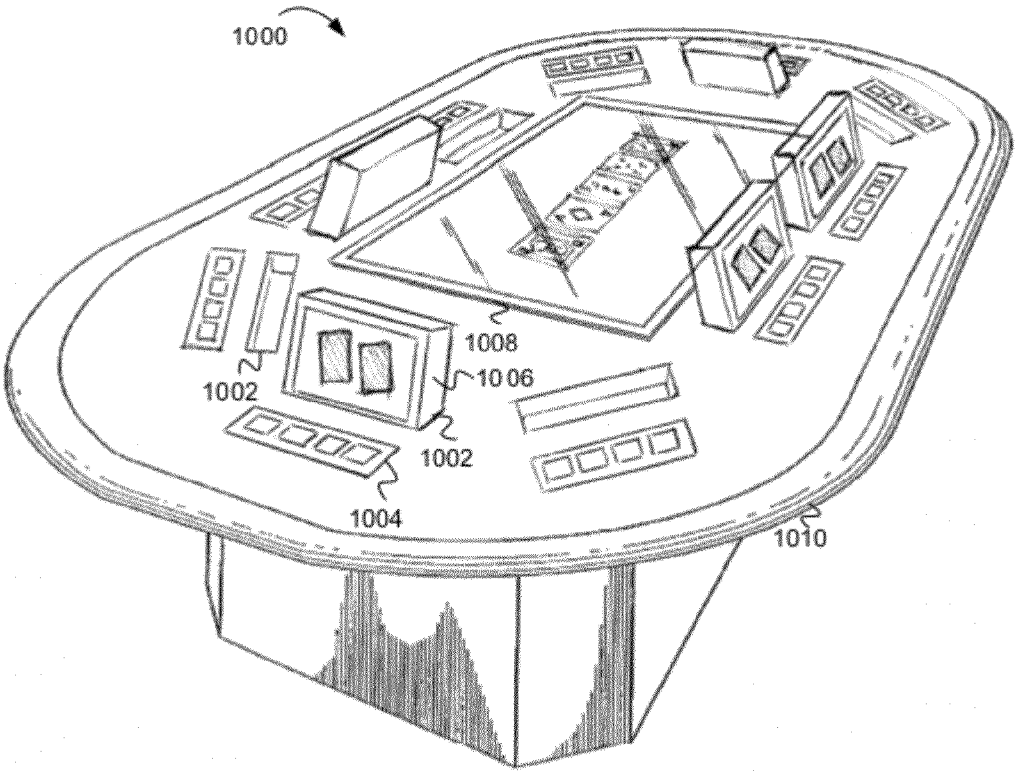
FIG. 10 is a perspective view of a community game table docking station, according to example embodiments of the invention.

FIG. 10 is a perspective view of a community game table docking station, according to example embodiments of the invention. In FIG. 10, the docking station 1000 includes a table 1010, community display 1008, docking ports 1002, and input/output devices 1004 (e.g., buttons, biometric devices, card readers, bill validators, etc.). As with any of the docking stations described herein, the docking station 1000 can present community wagering games hosted by a community game server (not shown). The docking station 1000 can work with the community game server to keep track of which mobile devices are docked at which docking ports. Identification of a particular mobile device can be provided via RFID, power or communication interfaces as described above, or other mechanisms. In one embodiment, after a mobile device 1006 docks with a docking port 1002, the docking port 1002 sends a message to the community game server indicating that the mobile device has docked at a particular docking port 1002 (e.g. via RFID). In another embodiment, the mobile device 1006 sends a message to the community game server indicating that the mobile device has docked at a particular docking port 1002 (e.g., via power or communications interface). As a result, the docking station 1000 and community game server can present community games in which player position is relevant to game play. For example, the docking station 1000 can present Video Texas Hold 'Em Poker games.

In one embodiment, a portion of the game state can be shown on the community display 1008, while the rest can be shown on the mobile devices 1006. For example, in Video Texas Hold 'Em Poker games, each player's "pocket cards" can be shown on the player's mobile device 1006, while the community cards are shown on the community display 1008. Alternatively, the docking station 100 can present the game state on either the mobile devices 1006, the community display 1008, or both.

In one embodiment, the docking station 1000 is connected via a network to player account services, which provide facilities for drawing money from player accounts for use in community games.

Figure 11:
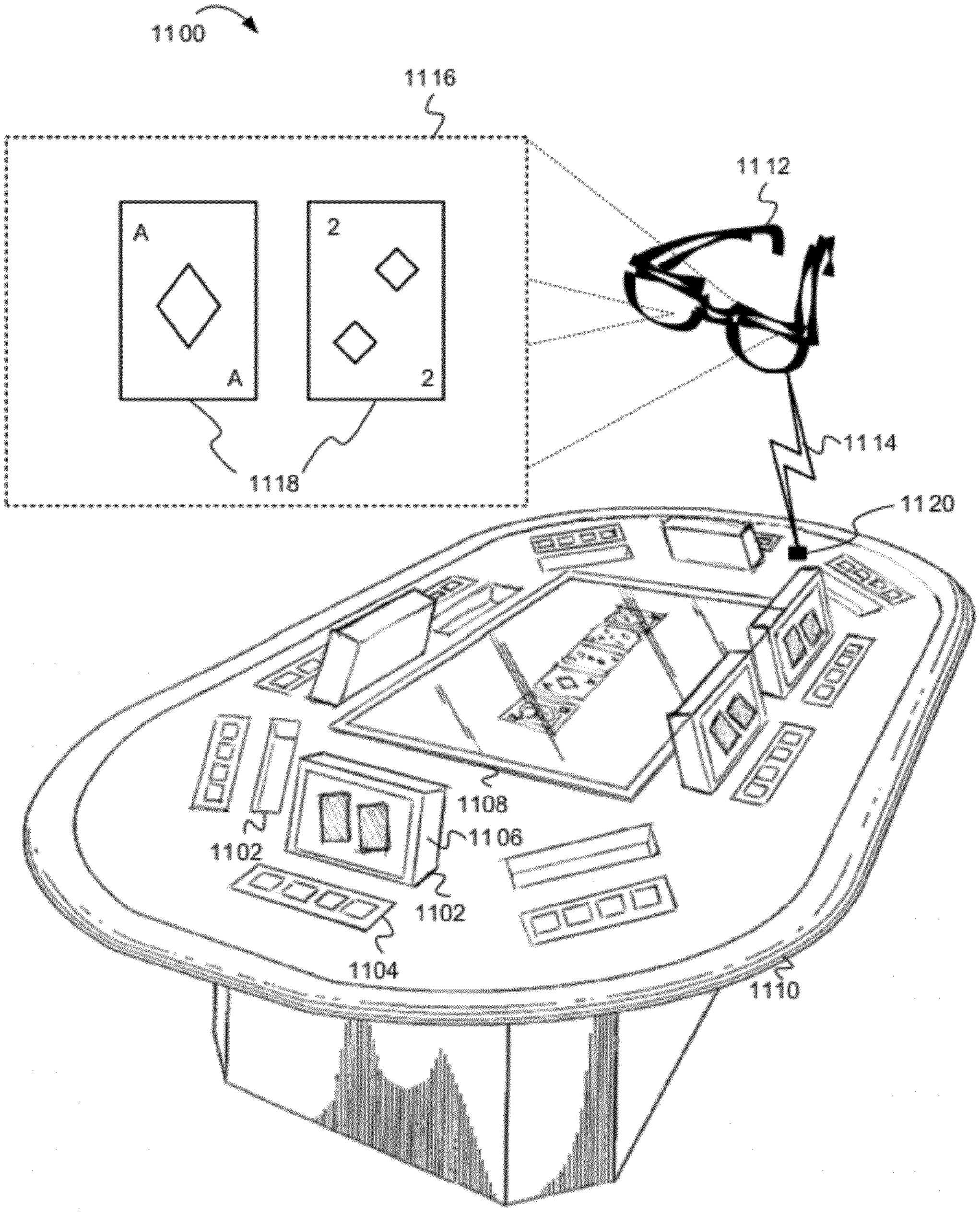
FIG. 11 is a perspective view of a community game table docking station configured for use with video headsets, according to example embodiments of the invention.

FIG. 11 is a perspective view of a community game table docking station configured for use with personal display devices, according to example embodiments of the invention. The docking station 1100 is similar to the docking station 1000 of FIG. 10. However, the docking station 1100 is configured for use with one or more personal display devices, such as a video headset 1112. The video headset 1112 can have a form factor similar to eye glasses. In one embodiment, one or more video ports 1120 can wirelessly (or in wired fashion) transmit video content to the video headset 1112, which in turn displays the video content. In one embodiment, the video headset 1112 can include one or more liquid crystal displays (LCDs). In other embodiments, the video headset includes other video technologies for presenting video content in a heads-up fashion.

As shown in FIG. 11, the video headset 1112 can present any suitable video content (e.g., game elements 1118) in a display area 1116 visible by a player wearing the headset 1112. The video headset 1112 can also include audio presentation devices (e.g., speakers) and any other suitable input/output devices.

The docking station 1100 can present community wagering games, as described above vis-à-vis FIG. 10. In some embodiments, during community wagering games, the docking station 1100 can present some game elements (e.g., playing cards, etc.) on the community display 1108, while presenting other game elements on the video headsets 1112. For example, during Video Texas Hold 'Em Poker games, the docking station 1100 can present each player's pocket cards 1118 on the player's video headset 1112. The community cards can appear on the community display 1108. As a result, the video headsets 1112 enable players to easily hide their pocket cards from others, eliminating any need for quick peeking or other short-term viewing of the pocket cards.

Although the docking station 1100 may present video content on the video headsets 1112, it can still receive input via the input/output devices 1104. In embodiments where the headsets 1112 include input/output devices (e.g., buttons, pointing devices, virtual keyboards, etc.), the docking station 1100 can present content absent the mobile devices 1106. For example, the docking station 1100 can channel all I/O associated with a wagering game to the video headset 1112. As a result, some embodiments of the docking station 1100 are configured for use without the mobile devices 1106.

In some embodiments, the docking station 1100 can present any of a game's elements on any or all of the video headset 1112, community display 1108, and mobile devices 1106. Additionally, the docking station 1100 can present non-wagering game content on some displays, as it presents wagering game content on other displays (e.g., headsets 1112, mobile devices 1106, and community display 1108).

This description continues with a discussion of operations performed by some embodiments of the invention.

Example Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., firmware). In some embodiments the operations are performed in series, while in other embodiments, the operations can be performed in parallel.

Figure 12:
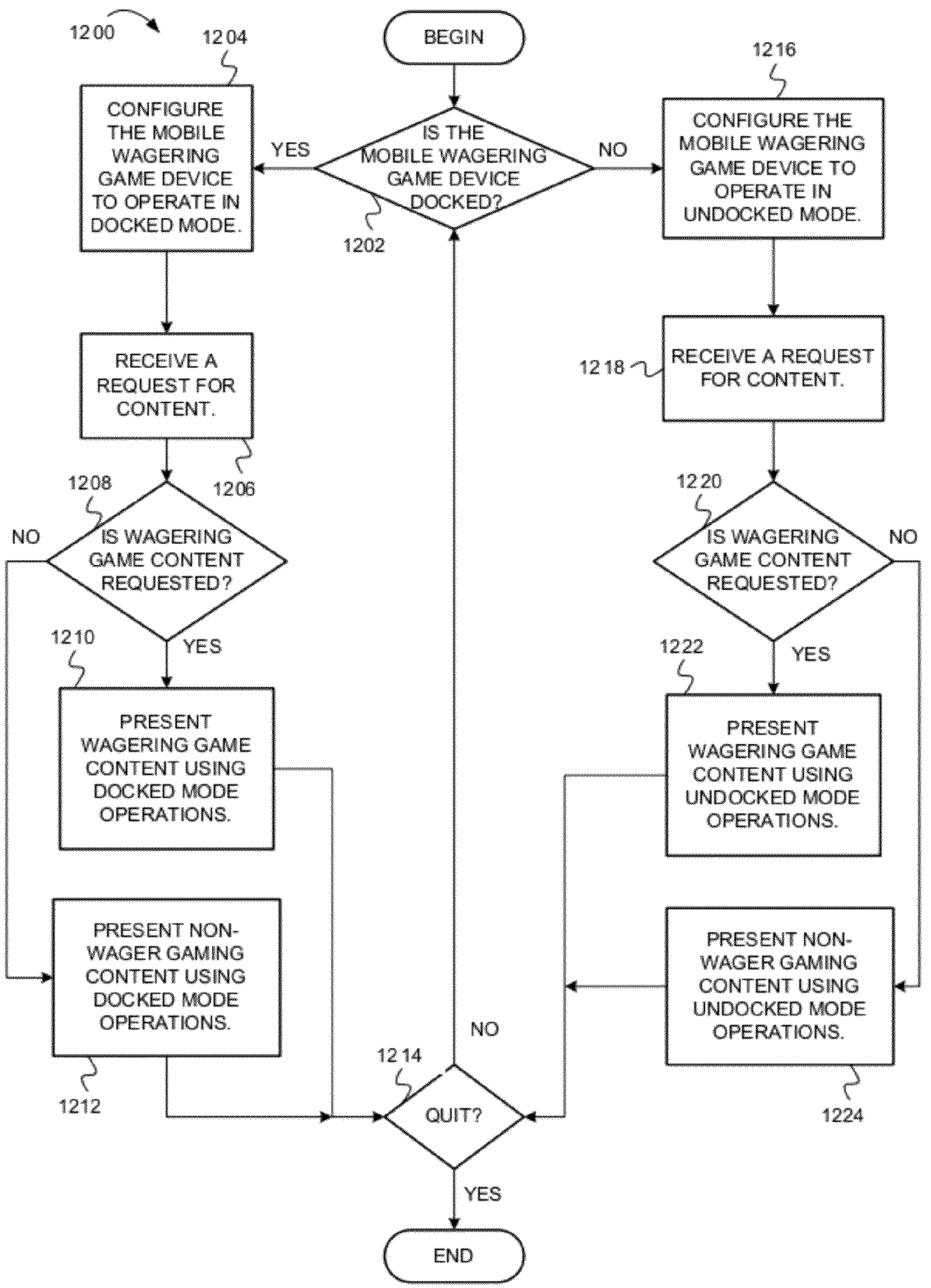
FIG. 12 is a flow diagram illustrating docked mode operations and undocked mode operations in a mobile wagering game device, according to example embodiments of the invention.
Figure 13:
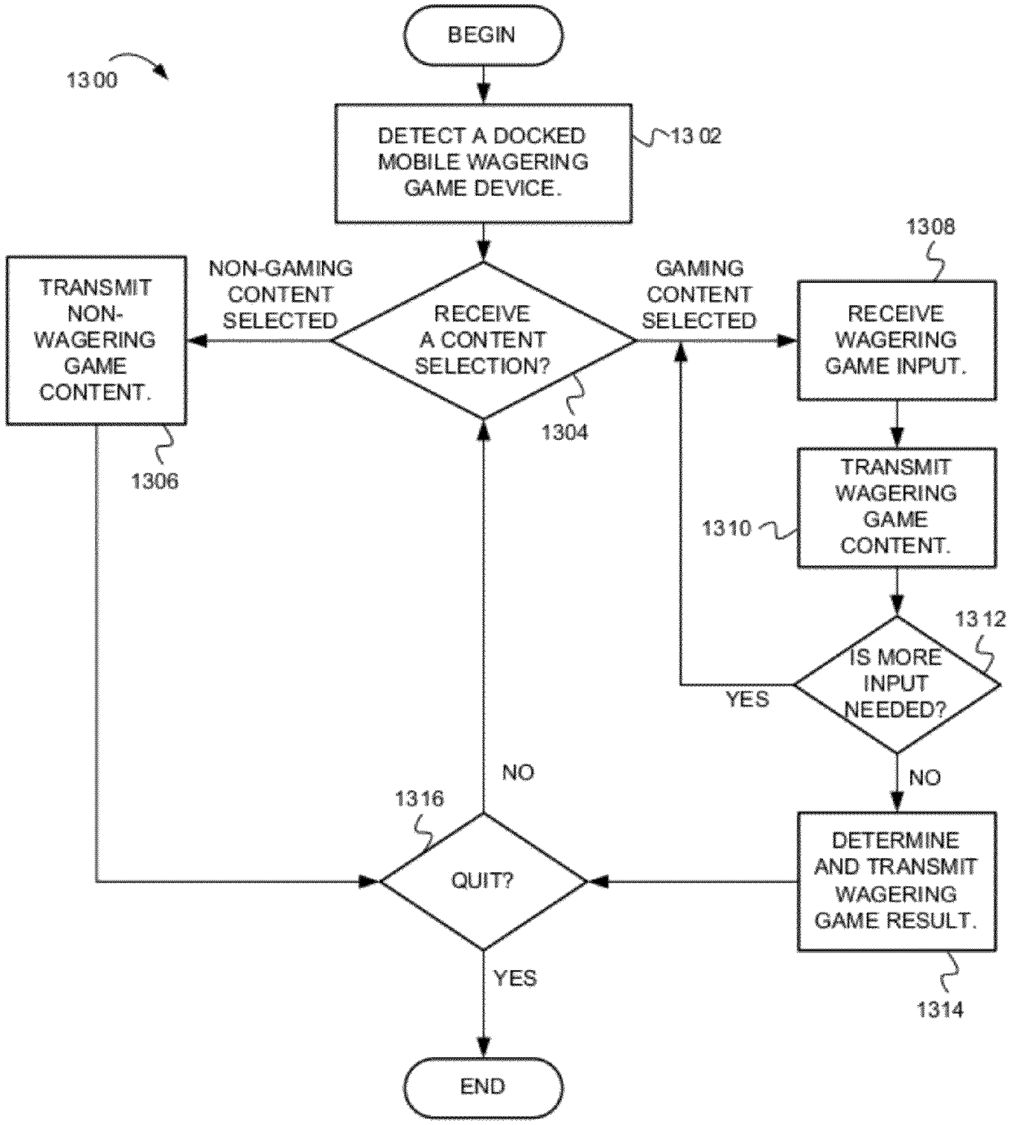
FIG. 13 is a flow diagram illustrating operations for hosting community wagering games for docked mobile devices, according to example embodiments of the invention.
Figure 14:
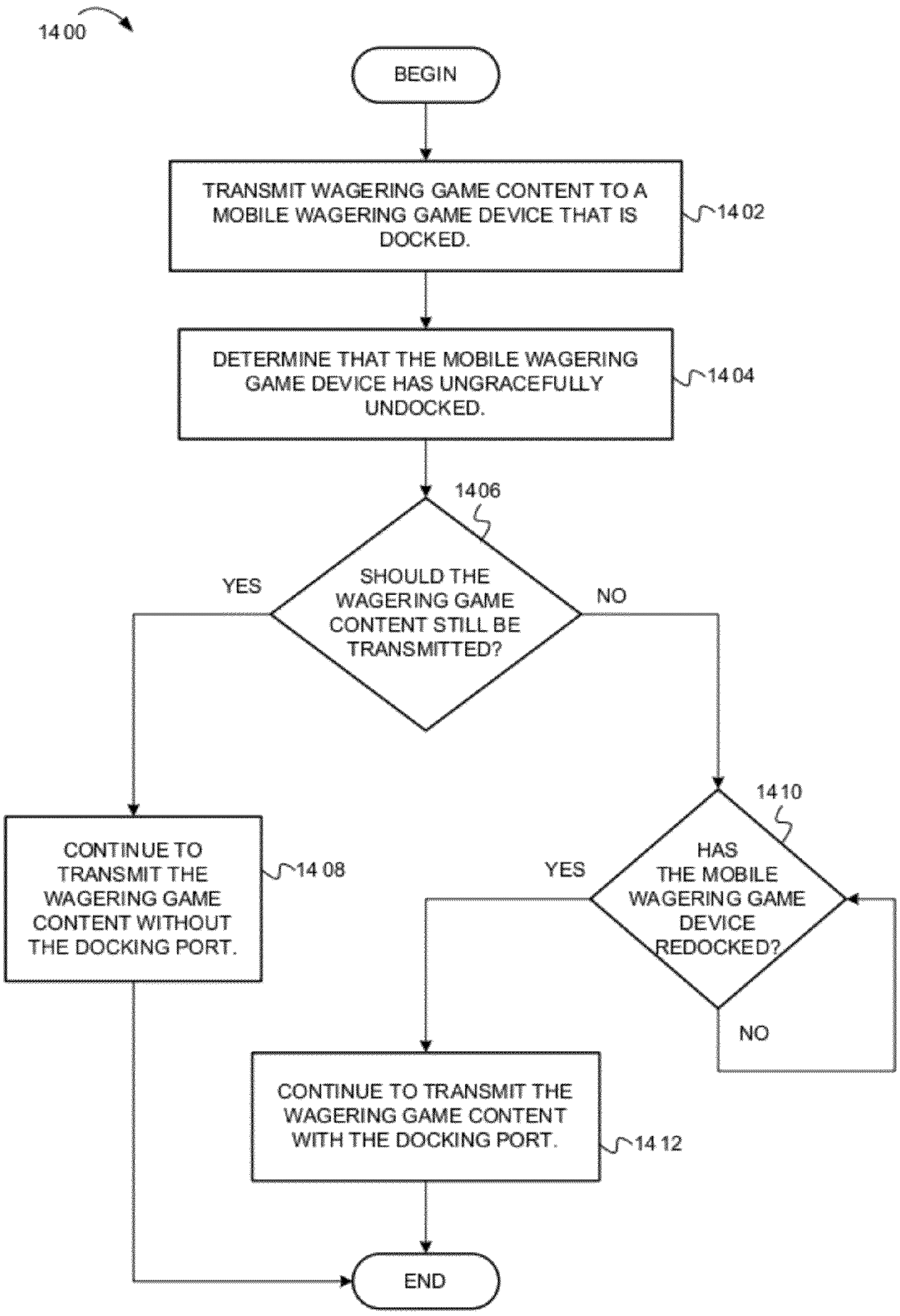
FIG. 14 is a flow diagram illustrating operations for how a game controller handles ungraceful undocking of a mobile wagering game device, according to example embodiments of the invention.
Figure 15:
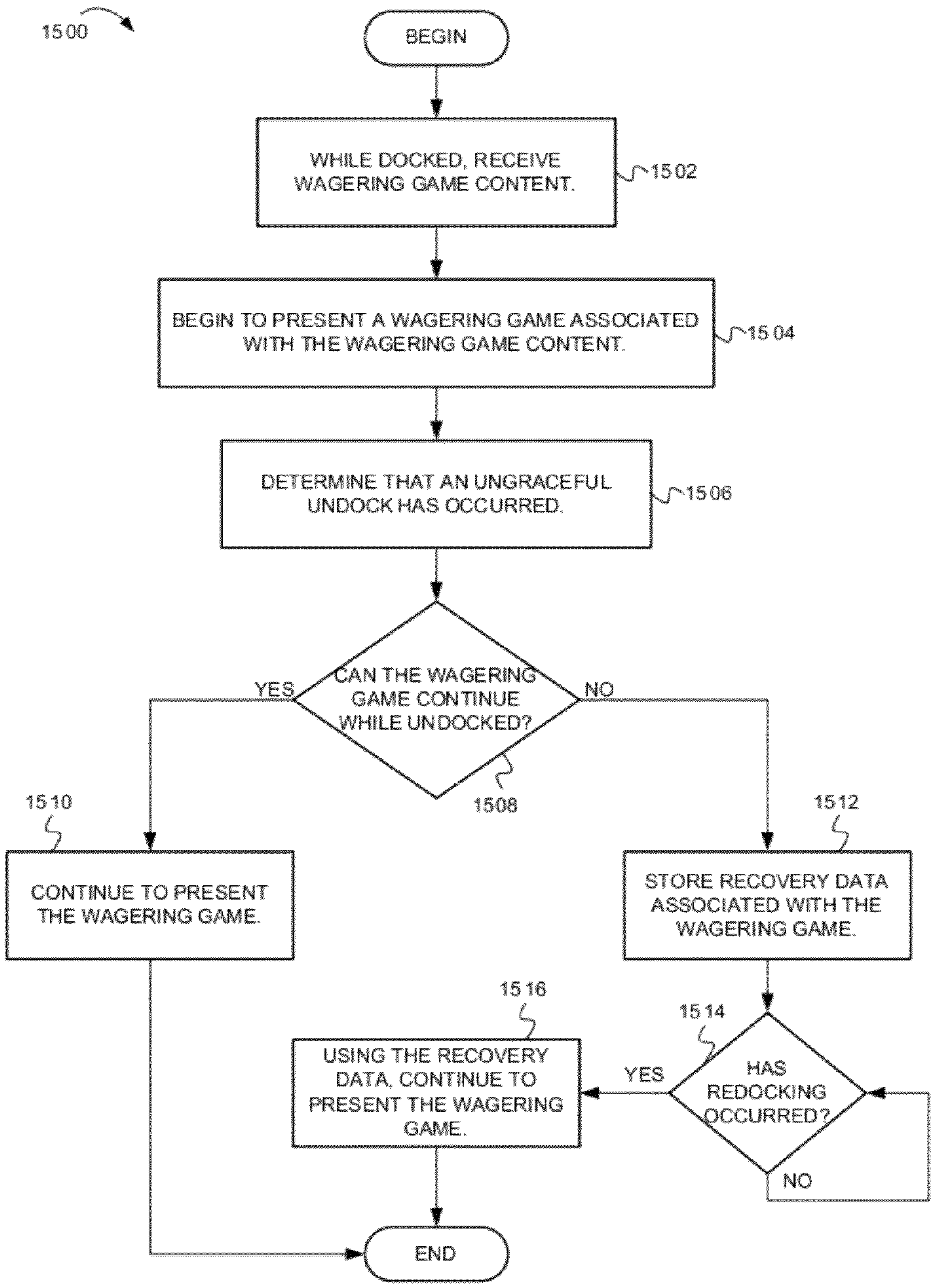
FIG. 15 is a flow diagram illustrating operations for how a mobile device handles ungraceful undocking from a docking station, according to example embodiments of the invention.

In this section, FIGS. 12 and 13 describe operations for presenting wagering games and non-wagering game content, while FIGS. 14 and 15 describe operations for handling ungraceful disconnections of mobile devices from docking stations. This section continues with a discussion of FIG. 12.

Presenting Wagering and Non-Wagering Content

FIG. 12 is a flow diagram illustrating docked mode operations and undocked mode operations in a mobile wagering game device, according to example embodiments of the invention. The flow 1200 begins at block 1202.

At block 1202, the docking controller 336 determines whether the mobile device 306 is docked with a docking station. In one embodiment, the docking controller 336 will consider the mobile device 306 to be docked when it detects receipt of power or communications through the docking port 338 or activation of RFID tag 348 of docking port 338. If the mobile device 306 is docked with a docking station, the flow continues at block 1204. Otherwise, the flow continues at block 1216.

At block 1204, the docking controller 336 configures the mobile device 306 to operate in docked mode. In one embodiment, if power is available through the dock power unit 340, the docking controller 336 configures the mobile device's components to operate at full power, drawing power from the dock power unit 340 instead of the power supply 332. In one embodiment, when dock power is available, the display 310 operates in its brightest mode, the presentation unit 308 processes graphics at their highest resolution, and the power supply 332 recharges itself. Additionally, in docked mode, the docking controller 336 can configure the presentation unit 308 to use peripheral devices available on the docking station. For example, the docking controller 336 can configure the presentation unit 308 to present bonus events on a display device available on the docking station or to use lights on the docking station in an attract mode. If the mobile device 306 is docked where no power is available, the mobile device 306 can draw power from its power supply 332.

If communications are available from the docking station, the docking controller 336 can configure the presentation unit 308 to present content received through the dock communication unit 342. Because the dock communication unit 342 may have higher communication bandwidth or higher security than the wireless communication unit 324, docking mode may enable the mobile device 306 to present content not available in undocked mode. For example, while docked, the mobile device 306 can receive and present live television shows, movies, or other streaming multimedia content. The flow continues at block 1206.

At block 1206, the presentation unit 308 receives a request for content. The request can be a request to play a wagering game or a request for non-wagering content, such as directions, television shows, etc. In one embodiment, the presentation unit 308 receives the request through an input/out device, such as the player input device 316. The flow continues at block 1208.

At block 1208, the presentation unit 308 determines whether wagering game content has been requested. For example, the presentation unit 308 determines whether the request is requesting a wagering game or non-wagering game content. If the request is for wagering game content, the flow continues at block 1210. Otherwise the flow continues at block 1212.

At block 1210, the presentation unit 308 presents wagering game content using docked mode operations. For example, the presentation unit 308 presents a wagering game using high-resolution graphics routines, where the primary display 310 is operating at its brightest. Additionally, the presentation unit 308 may utilize input/output devices available on the docking station. For example, the presentation unit 308 may present audio content through docking station speakers and print vouchers on a docking station printer. The flow continues at block 1214.

At block 1212, the presentation unit 308 presents non-wagering game content using docked mode operations. For example, the presentation unit 308 presents high definition television footage, high definition movie footage, or other high quality non-wagering game multimedia content. In one embodiment, the non-wagering game content, such as directions to a bar or restaurant, was selected based on the location of the docking station. The flow continues at block 1214.

At block 1214, the presentation unit 308 determines whether a player has shut-down the mobile device 306. If the device has been shut-down, the flow ends. Otherwise, the flow continues at block 1202.

At block 1216, the docking controller 336 configures the mobile device 306 to operate in undocked mode. In one embodiment, in undocked mode, the docking controller 336 configures the presentation unit 308 to present graphics in a low-power, low-resolution mode. The docking controller 336 can also configure the primary display 310 to present graphics in a low resolution. Additionally, the docking controller can configure the storage unit 330 to operate at reduced capacity, in order to save power. The flow continues at block 1218.

At block 1218, the presentation unit 308 receives a request for content. In one embodiment, the presentation unit 308 receives the request through an input/out device, such as the player input device 316. The flow continues at block 1220.

At block 1220, the presentation unit 308 determines whether wagering game content has been requested. For example, the presentation unit 308 determines whether the request to play a wagering game or to present non-wagering game content. If the request is for wagering game content, the flow continues at block 1222. Otherwise the flow continues at block 1224.

At block 1222, the presentation unit 308 presents wagering game content using undocked mode operations. For example, the presentation unit 308 renders a wagering game (e.g., video slots) using low-resolution graphics routines for presentation on the primary display 310, which is operating in a low resolution mode. Additionally, the sound content be ignored or presented in a low power, low quality mode. The flow continues at block 1214.

At block 1224, the presentation unit 308 presents non-wagering game content using undocked operations. In one embodiment, the presentation unit 308 can present content from the World Wide Web or other networks in low-resolution, low-power modes described above. The flow continues at block 1214.

While FIG. 12 describes a wagering device's undocked and docked modes of operation, FIG. 12 describes how community game controllers can host community games in which mobile devices participate.

FIG. 13 is a flow diagram illustrating operations for hosting community wagering games for docked mobile devices, according to example embodiments of the invention. The flow 1300 will be described with reference to the network architecture shown in FIG. 2. The flow 1300 begins at block 1302.

At block 1302, the community game controller 209 detects a docked mobile device 228. In one embodiment, community game controller 209 receives a signal through the docking port 222, where the signal identifies that the wagering device 228 is docked at the docking station 226. In one embodiment, the community game controller 209 can detect or identify at which docking port 222 the mobile device 228 has docked. As result, the community game controller 209 can support community games that require information about the players' positions around a table. For example, the community game controller 209 can host position-dependent games, such as at Video Texas Hold 'Em poker. The flow continues at block 1304.

At block 1304, the community game controller 229 receives a content selection. The content selection can specify a particular wagering game or particular non-wagering game content. If non-gaming content is selected, the flow continues at block 1306. Otherwise, the flow continues at block 1308.

At block 1306, the community game controller 209 transmits the selected non-wagering game content to the mobile device 228. For example, the community game controller 209 transmits selected multimedia instructional content, Internet content, television content, etc. to the mobile device 228. In one embodiment, the community game controller 209 facilitates delivery of the non-wagering game content by establishing a connection between the mobile device 228 and the non-wagering game content server 204. The flow continues at block 1316.

At block 1308, after receiving a gaming content selection (see block 1304), the community game controller 209 receives input for a community wagering game. For example, the community game controller 209 receives an indication that a player operating a docked mobile device 228 wants to enter a game of Video Texas Hole 'Em Poker. Because the mobile device 228 is docked, the player can enter the input using controls mounted on the docking station 226 or its own input devices (see FIGS. 5 and 10). The flow continues at block 1312.

At block 1312, the community game controller 209 transmits wagering game content. For example, in response to the input received at block 1310, the community game controller 209 sends video content for display on the community display 224, where the video content indicates that a new player has entered the poker game at a particular table position. The flow continues at block 1314.

At block 1314, the community game controller 209 determines whether more input is needed to complete the community game. For example, the community game controller 209 determines whether it needs more player input to finish the poker game. If more input is needed, the flow continues at block 1310. Otherwise, the flow continues at block 1316.

In one embodiment, the flow 1300 loops between blocks 1310, 1312, and 1314 until there is enough player input to complete a community wagering game. For example, after determining which docked mobile devices 228 are participating in a Video Texas Hold 'Em Poker game, the flow 1320 will loop until the community game controller 209 has received each mobile device's betting requests and other game input. As players increase their bets, fold their hands, etc., the community game controller 209 can reflect the player inputs on the community display 224 or the mobile devices 228 (see block 1310). If a player's table position affects the order in which player inputs should be collected, the community game controller 209 can use the position information collected at block 1302 to collect inputs in the proper order.

At block 1314, the community game controller 209 determines and transmits results for the community wagering game. For example, the community game controller 209 determines who won the poker game and it presents the results on the community display 228 or the docked mobile devices 228. The flow continues at block 1316.

At block 1316, the community game controller 209 determines whether the docked mobile device 228 has been removed from the docking station 226. If the mobile device 228 has been removed from the docking station 226, the flow ends. Otherwise, the flow continues at block 1304.

Ungraceful Undocking

This section continues with a discussion of operations for handling ungraceful undocking of mobile devices from docking stations. The discussion of FIG. 14 describes how embodiments of a game controller handle ungraceful undocking, while FIG. 15 describes how embodiments of a mobile device handle ungraceful undocking. This section continues with FIG. 14.

FIG. 14 is a flow diagram illustrating operations for how a game controller handles ungraceful undocking of a mobile wagering game device, according to example embodiments of the invention. The flow begins at block 1402.

At block 1402, the community game controller 209 begins transmitting wagering game content to a docked mobile device 228. In one embodiment the community game controller 209 can detect whether the mobile device 228 is docked because mobile device 228 sends a message when it docks. From block 1402, the flow continues at block 1404.

At block 1404, the community game controller 209 determines that the mobile device 228 has ungracefully undocked. In one embodiment, ungracefully undocking includes undocking while a wagering game is being presented. In one embodiment, the community game controller 209 and the docked mobile device 228 periodically exchange docking messages. The community game controller 209 can determine that the mobile device 228 has ungracefully undocked by determining that a message has not been received. The flow continues at block 1406.

At block 1406, the community game controller 209 determines whether it should continue transmitting wagering game content the mobile device 228. In one embodiment, the wagering game content is associated with a wagering game that requires mobile devices to be docked. For example, position-sensitive games (e.g., Video Texas Hold 'Em Poker) require players to be docked, so the community game controller 209 can determine player positions based on the docking ports 222 with which the mobile devices 228 are docked. In another embodiment, the community game controller may require that the mobile devices 228 be docked because a game has bandwidth and/or power requirements which are too high for undocked gaming. In yet another embodiment, the community game controller 209 hosts some community games in which the mobile devices do not have to be docked. In one embodiment, if the controller 209 requires the mobile device to be docked, it will not continue transmitting content. If the community controller 209 will continue transmitting wagering game content, the flow continues at block 1408. Otherwise, the flow continues at block 1410.

At block 1408, the community game controller 209 continues to transmit the wagering game content to the mobile device 228 through an interface other than the docking port 222. In one embodiment, the community game controller 209 transmits the wagering game content using a wireless signal. In one embodiment, the community game controller 209 transmits different wagering game content when a game is not docked. For example, the community game controller 209 transmits wagering game content requiring less bandwidth or less processing resources. From block 1408, the flow ends.

At block 1410, the community game controller 209 determines whether the mobile device 228 has re-docked. In one embodiment, if the wagering game is not player position sensitive, the mobile device 228 can re-dock at a different docking port 222 or a different docking station. In one embodiment, the community game controller 209 can wirelessly send a message to the mobile device 228 prompting the player to re-dock. If the mobile device 228 has not re-docked, the flow loops back to 1410. Otherwise, the flow continues at block 1412.

At block 1412, the community game controller 209 continues to transmit the wagering game content through the docking station. From block 1412, the flow ends.

FIG. 15 is a flow diagram illustrating operations for how a mobile device handles ungraceful undocking from a docking station, according to example embodiments of the invention. The flow begins at block 1502.

At block 1502, a mobile device 228 receives wagering game content while it is docked with a docking station 226. In one embodiment, the mobile device 228 receives the wagering game content from the community game controller 209. From block 1502, the flow continues at block 1504.

At block 1504, the mobile device 228 begins to present a wagering game associated with the wagering game content. From block 1504, the flow continues at block 1506.

At block 1506, the mobile device 228 determines that an ungraceful undock has occurred. In one embodiment the docking controller 336 determines that the mobile device 228 is undocked by determining that power is not being received via the dock power unit 340. In one embodiment, the docking controller determines that the undock is ungraceful because the undock occurs while a wagering game is being presented. From block 1506, the flow continues at block 1508.

At block 1508, the mobile device 228 determines whether the wagering game can be presented while the mobile device 228 is undocked. In one embodiment, the mobile device 228 can present the game in undocked mode if there is an available wireless signal through which it can communication with the community game controller 209. In another embodiment, the wagering game cannot be presented if it is needs player position information. In one embodiment, the mobile device 228 asks the community game controller 209 whether the wagering game can continue while the mobile device 228 is undocked. If the wagering game can continue to be presented, the flow continues at block 1510. Otherwise the flow continues at block 1512.

At block 1510, mobile device 228 continues to present the wagering game. From block 1510, the flow ends.

At block 1512, the mobile device 228 stores recovery data associated with the wagering game. In one embodiment, the recovery data includes game state data, monetary credit data, game asset data, and/or timestamp data. From block 1512, the flow continues at block 1514.

At block 1514, the mobile device 228 determines whether re-docking has occurred. In one embodiment, re-docking can occurs at the same docking station or at a different docking station. If re-docking has occurred, the flow continues at block 1516. Otherwise, mobile device 228 waits and the flow continues at block 1514.

At block 1516, the mobile device 228 uses the recovery data to continue presenting the wagering game. In one embodiment, the wagering game is resumed from the state at which the ungraceful undocking occurred. In another embodiment, the wagering game is a community game and cannot be resumed from a state at which the ungraceful undocking occurred. In one embodiment, the mobile device 228 uses the recovery data to credit or debit monetary accounts and game asset status. From block 1516, the flow ends.

General

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as falling within the inventive subject matter, which is set forth in the following claims.

The invention claimed is:

1. A method comprising:

detecting that a plurality of mobile devices are docked at a docking station, the docking station having a plurality of docking ports defining positions;

conducting a community wagering game for the plurality of mobile devices docked at the docking station;

identifying a position of each of the plurality of mobile devices at the docking station by determining which of the plurality of docking ports each respective mobile device is currently docked within; and displaying content of the community wagering game on a community display of the docking station, the content being configured according to the identified positions of each of the plurality of mobile devices.

2. The method of claim 1, further comprising:

receiving input from the plurality of mobile devices.

3. The method of claim 2, further comprising:

determining an order to receive the input from the plurality of mobile devices based on the identified position of each of the mobile devices.

4. The method of claim 1, further comprising:

displaying content on the community display indicating a player has joined the community wagering game upon receiving a message from a mobile device that has docked with docking station.

5. The method of claim 1, further comprising:

identifying a first mobile device of the plurality of mobile devices.

6. The method of claim 5, wherein identifying the first mobile device of the plurality of mobile devices comprises:

activating an RFID tag of the first mobile device.

7. A system comprising:

a docking station having a plurality of docking ports defining positions and a community display; and a community game controller configured to:

detect that a plurality of mobile devices are docked at the docking station;

conduct a community wagering game for the plurality of mobile devices docked at the docking station;

identify a position of each of the plurality of mobile devices at the docking station by determining which of the plurality of docking ports each respective mobile device is currently docked within; and display content of the community game on the community display, the content being configured according to the identified positions of each of the plurality of mobile devices.

8. The system of claim 7, wherein the community game controller is configured to receive a message from one of the plurality of mobile devices when the one of the plurality of mobile devices docks with the docking station.

9. The system of claim 8, wherein the community game controller is configured to determine that one of the plurality of mobile devices has unlocked from one of a plurality of docking ports of the docking station.

10. The system of claim 9, wherein the community game controller is configured to stop conducting the displaying of content of the community wagering game until the one of the plurality of mobile devices is redocked if the player position information is needed for the community wagering game.

11. The system of claim 9, wherein the community game controller is configured to determine that the one of the plurality of mobile devices has redocked at a different docking port.

12. A non-transitory computer-readable storage device comprising instructions stored thereon, which when executed by at least one processor, cause the at least one processor to:

detect, at a community game controller, that a plurality of mobile devices are docked at a docking station, the docking station having a plurality of docking ports;

conduct a community wagering game for the plurality of mobile devices docked at the docking station;

identify a position of each of the plurality of mobile devices at the docking station by determining which of the plurality of docking ports each respective mobile device is currently docked within; and display content of the community wagering game on a community display of the docking station, the content being configured according to the identified positions of each of the plurality of mobile devices.

13. The non-transitory computer-readable storage device of claim 12, further comprising instructions, which when executed by the at least one processor, cause the at least one processor to:

receive input from the plurality of mobile devices associated with the community wagering game.

14. The non-transitory computer-readable storage device of claim 13, further comprising instructions, which when executed by the at least one processor, cause the at least one processor to:

determine an order to receive input from the plurality of mobile devices based on the identified position of each of the mobile devices.

15. The non-transitory computer-readable storage device of claim 12, further comprising instructions, which when executed by the at least one processor, cause the at least one processor to:

display content on the community display indicating a player has joined the community wagering game upon receiving a message from one of the mobile devices.

16. The non-transitory computer-readable storage device of claim 12, further comprising instructions, which when executed by the at least one processor, cause the at least one processor to:

identify a first mobile device of the plurality of mobile devices.

17. The non-transitory computer-readable storage device of claim 16, wherein identifying the first mobile device of the plurality of mobile devices comprises:

activating an RFID tag of the first mobile device.

* * * * *